United States Patent
Sennoun et al.

(10) Patent No.: US 10,581,639 B2
(45) Date of Patent: Mar. 3, 2020

(54) METHOD FOR SELECTING A GATEWAY FOR SENDING A FRAME

(71) Applicant: SAGEMCOM ENERGY & TELECOM SAS, Rueil Malmaison (FR)

(72) Inventors: Yassir Sennoun, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/345,892

(22) PCT Filed: Oct. 23, 2017

(86) PCT No.: PCT/EP2017/076981
§ 371 (c)(1),
(2) Date: Apr. 29, 2019

(87) PCT Pub. No.: WO2018/077790
PCT Pub. Date: May 3, 2018

(65) Prior Publication Data
US 2019/0280897 A1    Sep. 12, 2019

(30) Foreign Application Priority Data
Oct. 28, 2016   (FR) ..................................... 1660505

(51) Int. Cl.
*H04W 4/00* (2018.01)
*H04L 12/66* (2006.01)
(Continued)

(52) U.S. Cl.
CPC .......... *H04L 12/66* (2013.01); *H04L 12/2834* (2013.01); *H04L 12/2854* (2013.01); *H04L 12/4625* (2013.01)

(58) Field of Classification Search
None
See application file for complete search history.

(56) References Cited

U.S. PATENT DOCUMENTS

2004/0181467 A1* 9/2004 Raiyani ................ G06Q 10/087
                                                              705/28
2014/0341217 A1* 11/2014 Eisner ..................... G06F 9/546
                                                              370/392
(Continued)

FOREIGN PATENT DOCUMENTS

WO    2016/005371 A1    1/2016

OTHER PUBLICATIONS

Jan. 2, 2018 International Search Report issued in International Patent Application No. PCT/EP2017/076981.
(Continued)

*Primary Examiner* — Phirin Sam
(74) *Attorney, Agent, or Firm* — Oliff PLC; R. Brian Drozd

(57) ABSTRACT

Method for a communication system comprising an electronic device and a plurality of gateways, the electronic device and each gateway being adapted for sending and receiving frames on a radio frequency band, each gateway being connected to the same central server, a first frame being sent by the electronic device to the central server, the frame comprising an identifier of the electronic device, each gateway receiving said frame and transmitting the received frame, in association with an identifier of the gateway, to the central server, a response delay being predefined for responding to the first frame, the method allowing selection by the central server of a gateway among the plurality of (Continued)

gateways for sending a second frame to the electronic device in response to the first frame.

7 Claims, 10 Drawing Sheets

(51) Int. Cl.
    *H04L 12/28*     (2006.01)
    *H04L 12/46*     (2006.01)

(56) References Cited

U.S. PATENT DOCUMENTS

2016/0255139 A1*   9/2016  Rathod ................... H04L 67/10
                                                                   709/203
2018/0218035 A1*   8/2018  Kealey ................. G06F 16/951

OTHER PUBLICATIONS

Neumann et al; "Indoor Deployment of Low-Power Wide Area Networks (LPWAN): a LoRaWAN case study;" IEE 12th International Conderence on Wireless and Mobile Computing, Networking and Communications (WiMob); 2016.

* cited by examiner

METHOD FOR SELECTING A GATEWAY FOR SENDING A FRAME

The present invention relates to the general field of telecommunications. The invention relates more particularly to the field of wireless communications for communicating objects (Machine to Machine—M2M), and more specifically the field of communication networks known as "Long Range Wide-Area Networks ☐ LoRaWAN☐.

A long range wide-area network allows the connection of communicating objects and obeys constraints different from those of a conventional communication network such as a GSM (Global System for Mobile) network or a UMTS (Universal Mobile Telecommunications System) network. In particular, this type of network frequently uses frequency bands known as ISM (Industrial, Scientific and Medical) bands. These frequency bands are therefore shared by a plurality of network operators and it is then necessary to reduce to a minimum the consumption of the radio resource available, whether in the so-called uplink direction (from a terminal electronic device to the network core) or in the so-called downlink direction (from the network core to a terminal electronic device).

FIG. 1 illustrates a conventional architecture of a communication network enabling a connected object 101 to communicate with a central server 110. The following description emphasises the LoRa™ standard (the standard published by the LoRa Alliance) but other communication technologies are possible. The connected object, or terminal, 101 is typically an electronic device comprising a radio transmitter. The radio transmitter is adapted for transmitting and receiving frames or messages via one carrier frequency among a plurality of carrier frequencies included in a predetermined frequency band, for example an ISM frequency band. When the radio transmitter transmits a frame, the latter may be received by one or more of the radio receivers or gateways 120, 12p, . . . , 12N (N being greater than 0 and p between 0 and N). The connected object 101 being potentially mobile, unlike the gateways 120, 12p, . . . , 12N, which are placed at fixed points, a frame transmitted by the connected object 101 may be received by one or more gateways 120, 12p, . . . , 12N. Each gateway 120, 12p, . . . , 12N is connected, possibly via a different network and technology, to a central server 110 referred to as the LNS (LoRa network server). Each gateway 120, 12p, . . . , 12N receiving a frame from the connected object 101 then transmits this frame to the central server 110. If a frame transmitted by the connected object 101 is received by m gateways 120, 12p, . . . , 12N, then the central server receives m examples or copies of this same frame retransmitted by the m gateways (unless there is a communication problem between a gateway and the central server 110 causing a loss of frame). It should be noted that each gateway 120, 12p, . . . , 12N is connected to the central server 110 by a communication network that may be different. Thus, as illustrated in FIG. 1, the gateway 120, 12p, . . . , 12N is connected to the central server 110 via the network 131 and the network 130, possibly with a different technology. Each communication network, for example the communication networks 130 and 131, allowing connection of a gateway 120, 12p, . . . , 12N to the central server 110 may therefore cause a different delay in transmission of the frames (or latency), a transmission delay that may be related to the technology used by the communication network, but also possibly to congestion on said communication network. The transmission delay is typically around 10 or 100 milliseconds, but may be as much as several seconds in some cases.

When the central server 110 receives a frame from the connected object 101, the LoRa™ standard defines a response delay (hereinafter "RXDelay") so that the central server 110 can, by sending a frame, respond to the connected object 101. Indeed, in order to reduce the energy consumption, the connected object 101 may, following the sending of a frame, go on standby, and start to listen for any response only after the expiry of the response delay, and this for a given length of time. Possibly, the standard may even define a plurality of possible response delays (for example "RX1 Delay" and "RX2 Delay" for the LoRa™ standard), the connected object listening for a possible response at the expiry of each delay for a given length of time. The length of the response delay or delays is parameterised by an operator of the communication network. Typically a length of a response delay is around one or several seconds.

Each frame sent comprises a counter ("frame counter", hereinafter "FcntUp"), the value of the counter being incremented at each sending of a new frame by the connected object 101. In the absence of a response to a previously sent frame, the connected object 101 may resend said frame. According to the LoRa™ standard, the value of the counter "FcntUp" for the resent frame is identical to that of the previously sent frame. In other words, a frame and a corresponding resent frame have the same value of the "FcntUp" counter.

When the connected object 101 is connected to more than one gateway 120, 12p, . . . , 12N, the central server 110 may therefore potentially receive a plurality of frames, retransmitted by a plurality of gateways 120, 12p, . . . , 12N, these frames all comprising a counter with the same value: each frame may correspond either to an example of the frame sent by the connected object 101 that passed through a different gateway 120, 12p, . . . , 12N, or to a possible resending of the frame. It should be noted that a resent frame may itself be received in several examples by the central server 110 if it passes via a plurality of gateways 120, 12p, . . . , 12N.

When the central server 110 needs to send a frame to the connected object 101, for example in response to a frame sent by the connected object, the central server 110 must select a gateway among the gateways 120, 12p, . . . , 12N so that this gateway selected sends the frame sent by the central server 110 to the connected object. Frequently, the central server 110 receives the frame sent by connected object only through a single gateway (uplink direction). The central server 110 therefore selects the same gateway for sending a frame to the connected object (downlink direction). When the central server 110 receives several examples or copies of the same frame sent by the connected object 101 via different gateways, selecting one gateway among these various gateways available is not obvious. In a first approach, the central server 110 selects all the gateways that transmitted the frame received. This approach is far from being optimum since it unnecessarily approaches a plurality of gateways and the connected object 101 receives a plurality of examples of the same frame. In a second approach, the central server 110 selects the gateway that transmitted the frame that was received first by the central server 110. This approach is however not optimum since it tends to favour the selection of gateways that are connected to the central server 110 by a network 130 or 131 offering low latency, allowing rapid transmission of the frames between these gateways and the central server 110. These gateways are consequently frequently selected and may be congested whereas other gateways are lightly stressed.

It should also be noted that, apart from the fact that the frequency bands used by a communication network illustrated in FIG. 1 are typically shared by a plurality of network operators, and must therefore be conserved, each gateway must comply with the use constraints of these frequency bands. Indeed, a so-called duty cycle mechanism is frequently established in order to limit the use of the bandwidth by a gateway. This duty cycle mechanism defines a maximum ratio of the transmission time to a given period for a carrier frequency included in the frequency band. This ratio may be defined per group of carrier frequencies or sub-bands.

It should also be noted that a standard such as the LoRa™ standard imposes constraints on the choice of the carrier frequency to be used by a gateway selected for the sending of a frame in response to a frame sent by a connected object 101. Thus, when a connected object 101 sends a frame, it awaits either a response in a first response window or a response in a second response window. The first response window is defined for example by a waiting delay "RXDelay1" and the second response window by a waiting delay "RXDelay2". A frame sent in response in the first response window must be sent on the same carrier frequency as the frame sent by the connected object. A frame sent in response in the second response window must be sent on a predetermined carrier frequency.

It is therefore necessary to propose a method enabling a central server 110 to select a gateway 120, 12p, . . . , 12N among a plurality of possible gateways for sending a frame to a connected object, the gateway complying with the various radio constraints imposed.

The invention relates to a method for a communication system comprising an electronic device and a plurality of gateways, the electronic device and each gateway being adapted for transmitting and receiving frames on a radio frequency band, each gateway being connected to the same central server, a first frame being sent by the electronic device to the central server, the frame comprising an identifier of the electronic device, each gateway receiving said frame and transmitting the received frame, in association with an identifier of the gateway, to the central server, a response delay being predefined for responding to the first frame, the method enabling selection by the central server of a gateway among the plurality of gateways for sending a second frame to the electronic device in response to the first frame, the method being executed by the central server and comprising the steps of:

receiving the first frame from a first gateway.
determining a moment of sending and a duration of the second frame that is to be sent in response,
creating a list in association with the identifier of the electronic device, the list comprising the identifier of the first gateway,
triggering a waiting delay during which, if the central server receives from an other gateway another frame sent by the electronic device, then:
adding the identifier of the other gateway that transmitted the frame to the list,
at the expiry of the waiting delay, choosing at least one gateway the identifier of which is included in the list and, for this gateway:
finding planning data for frame sending by said gateway, and
checking whether selection criteria, dependent on the moment of sending and on the duration of the second frame, as well as on the planning data for frames sending of the gateway, are met,
if the selection criteria are met, then selecting said gateway for sending the second frame in response to the first frame to the electronic device.

Advantageously, the method enables a central server, for example an LNS server, receiving a plurality of examples of the same frame sent by an electronic device, to select a gateway for sending a response frame in return. Indeed, since each example of the frame sent by the electronic device has passed via a different gateway, the central server may potentially respond via all these gateways. The method advantageously allows selection of a single gateway for sending the response frame, which reduces the bandwidth consumption by avoiding sending said response frame via all the available gateways. The method also ensures that the selected gateway is in a position to receive the response frame and to retransmit it to the electronic device in time, namely within the response delay. The method also ensures selection of a gateway the planning data for frames sending of which are compatible with the planning of the sending of the response frame for this gateway.

According to a complementary embodiment of the invention, each gateway transmitting a received frame in association with an identifier of the gateway and an indication about the reception power of the frame, during the step of adding an identifier of a gateway to the list, the indication about the reception power is added in association with the identifier of the gateway and, during the step of choosing a gateway in the list, the choice is dependent on the reception power associated with each identifier.

Advantageously, the method enables selecting a gateway the connection level of which with the electronic device guarantees good transmission of the response frame.

According to a complementary embodiment of the invention, if, during the waiting delay, the central server receives a frame the reception power of which is lower than a predetermined value, then said frame is ignored for the remainder of the method.

Advantageously, the gateways the connection level of which with the electronic device is of poor quality are eliminated from the selection procedure. This guarantees that only a gateway where the connection level is of quality can be selected.

According to a complementary embodiment of the invention, the planning data on the frame sending for each gateway comprising a parameter referred to as duty cycle, said parameter being a maximum ratio of the time spent by the said gateway in sending frames over a given period, each gateway in the list being successively chosen in order to check the selection criteria, the step of selecting the gateway comprises a step of determining the value of the duty cycle at the moment of sending of the second frame for a gateway, and the selection is dependent on the determined value of the duty cycle.

Advantageously, the method takes into account duty cycle compliance constraints for each gateway.

The invention also relates to a central server for a communication system comprising an electronic device and a plurality of gateways, the electronic device and each gateway being adapted for sending and receiving frames on a radio frequency band, each gateway being connected to the central server, a first frame being sent by the electronic device to the central server, the frame comprising an identifier of the electronic device, each gateway receiving said frame and transmitting the received frame, in association with an identifier of the gateway, to the central server, a response delay being predefined for responding to the first frame, the central server being adapted, in order to select a gateway among the plurality of gateways for sending a second frame to the electronic device in response to the first frame, for:
 receiving the first frame from a first gateway,
 determining a moment of sending and a duration of the second frame that is to be sent in response,
 creating a list in association with the identifier of the electronic device, the list comprising the identifier of the first gateway,
 triggering a waiting delay during which, if the central server receives from an other gateway another frame sent by the electronic device, then:
 adding the identifier of the other gateway that transmitted the frame to the list,
 at the expiry of the waiting delay, choosing at least one gateway the identifier of which is included in the list and, for this gateway:
 finding planning data for frame sending by said gateway, and
 checking whether selection criteria dependent on the moment of sending and on the duration of the second frame as well as on the planning data for frames sending of the gateway, are met,
 if the selection criteria are met, then selecting said gateway for sending the second frame in response to the first frame to the electronic device.

The invention also relates to a communication system comprising an electronic device and a plurality of gateways, the electronic device and each gateway being adapted for sending and receiving frames on a radio-frequency band, each gateway being connected to the same central server, a first frame being sent by the electronic device to the central server, the frame comprising an identifier of the electronic device, each gateway receiving said frame and transmitting the received frame, in association with an identifier of the gateway, to the central server, a response delay being predefined in order to respond to the first frame, the central server being adapted, in order to select a gateway among the plurality of gateways for sending a second frame to the electronic device in response to the first frame, for:
 receiving the first frame from a first gateway,
 determining a moment of sending and a duration of the second frame that is to be sent in response,
 creating a list in association with the identifier of the electronic device, the list comprising the identifier of the first gateway,
 triggering a waiting delay during which, if the central server receives from an other gateway another frame sent by the electronic device, then:
 adding the identifier of the other gateway that transmitted the frame to the list,
 at the expiry of the waiting delay, choosing at least one gateway the identifier of which is included in the list and, for this gateway:
 finding planning data for frame sending by said gateway, and
 checking whether selection criteria dependent on the moment of sending and on the duration of the second frame as well as on the planning data for frames sending of the gateway, are met,
 if the selection criteria are met, then selecting said gateway for sending the second frame in response to the first frame to the electronic device.

The invention also relates to a computer program that can be stored on a medium and/or downloaded from a communication network in order to be read by a processor. This computer program comprises instructions for implementing all or some of the steps of the methods mentioned above when said program is executed by the processor.

The invention also relates to an information storage medium comprising such a computer program.

The features of the invention mentioned above, as well as others, will emerge more clearly from a reading of the following description of an example embodiment, said description being given in relation to the accompanying drawings, among which:

The first embodiment of the invention described below corresponds to an embodiment in which each gateway can send only one frame at a time independently of the number of frequencies or frequency sub-bands available. In other words, as from the moment when a frame is planned for sending on a first frequency included in a frequency sub-band, the gateway cannot simultaneously send another frame on another frequency, whether or not this other frequency belongs to the same frequency sub-band. It is thus not possible for two frames to overlap, even partially, and this independently of the sending frequency of each frame. This first embodiment is therefore suitable for inexpensive gateways. The descriptions of FIGS. 2, 3, 4, 5, 6 and 7 correspond to this first embodiment of the invention.

In the second embodiment of the invention, each gateway is capable of sending at least two messages at the same time, each message being sent on a different frequency. Each gateway can send at least two messages simultaneously on at least two different frequencies, the at least two frequencies possibly lying in the same frequency sub-band. The descriptions of FIGS. 9 and 10 correspond to the second embodiment of the invention.

Figure 1:
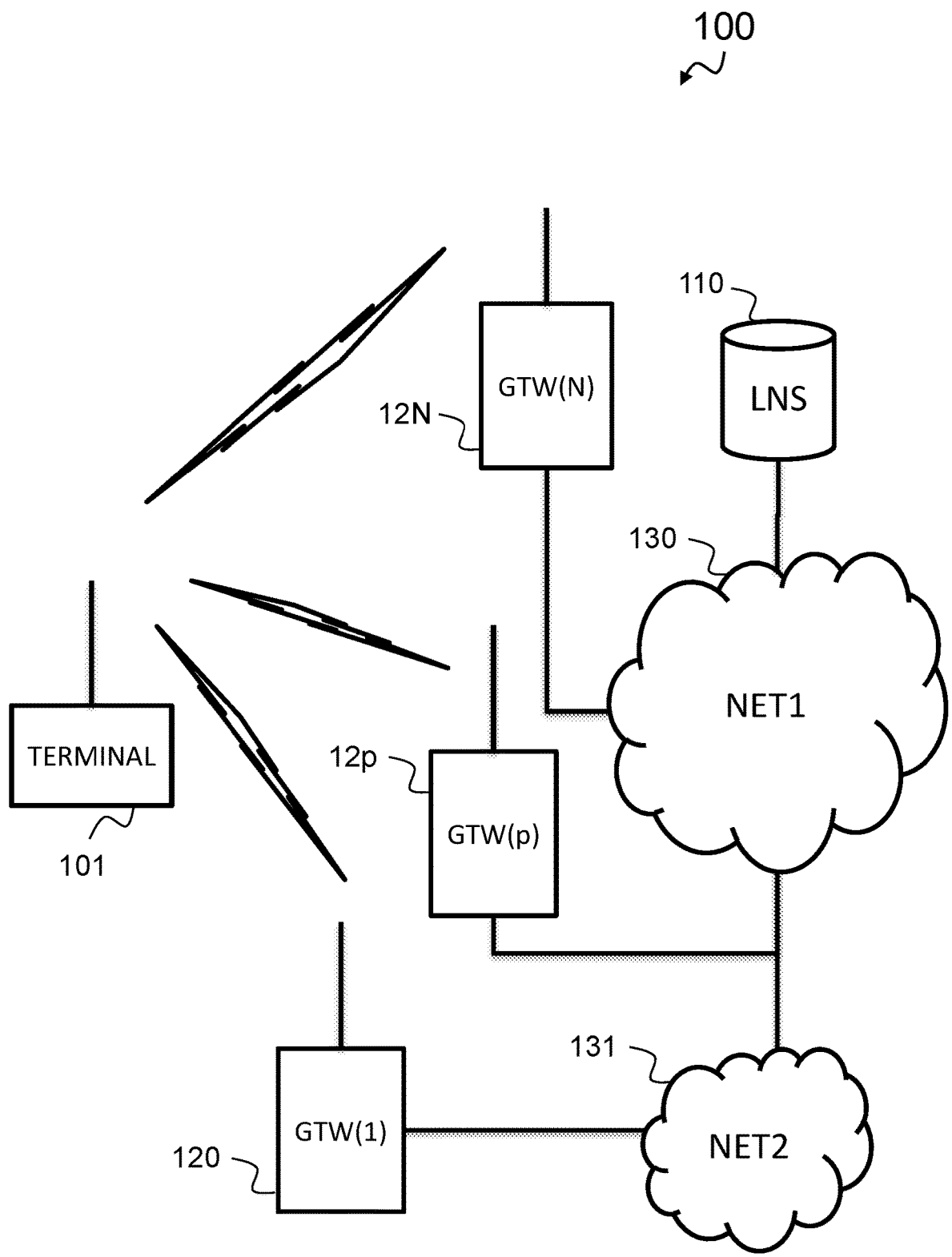
FIG. 1 illustrates schematically a conventional architecture of a communication network known as a "long range wide-area network", typically in accordance with a LoRa™ standard.
Figure 2:
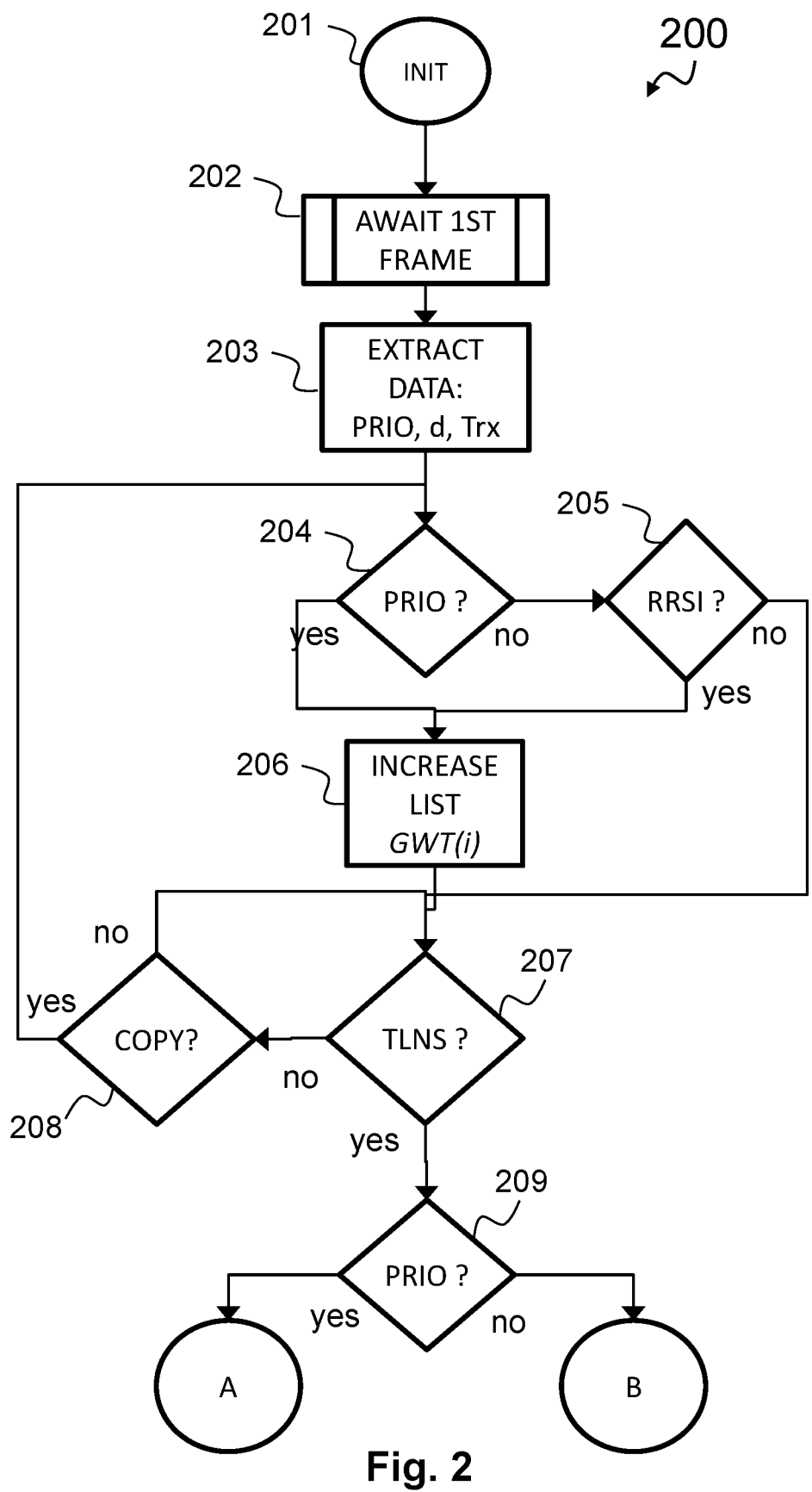
FIGS. 2, 3 and 4 illustrate schematically a method for the selection, by a central server of a communication network known as a "long range wide-area network", of a gateway among a plurality of gateways for sending a frame to an electronic device in response to a frame sent by this electronic device, according to a first embodiment of the invention.
Figure 3:
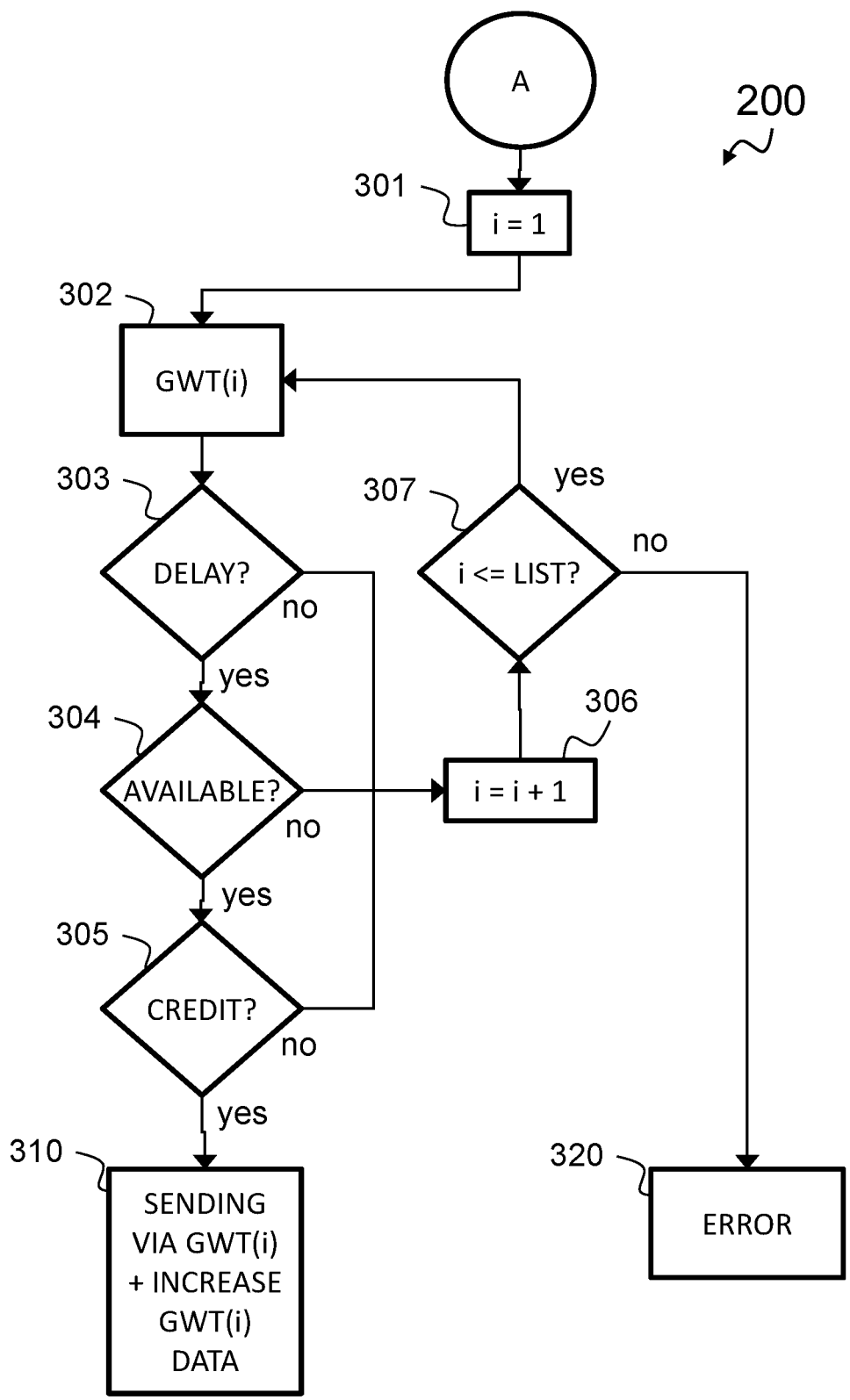
Figure 4:
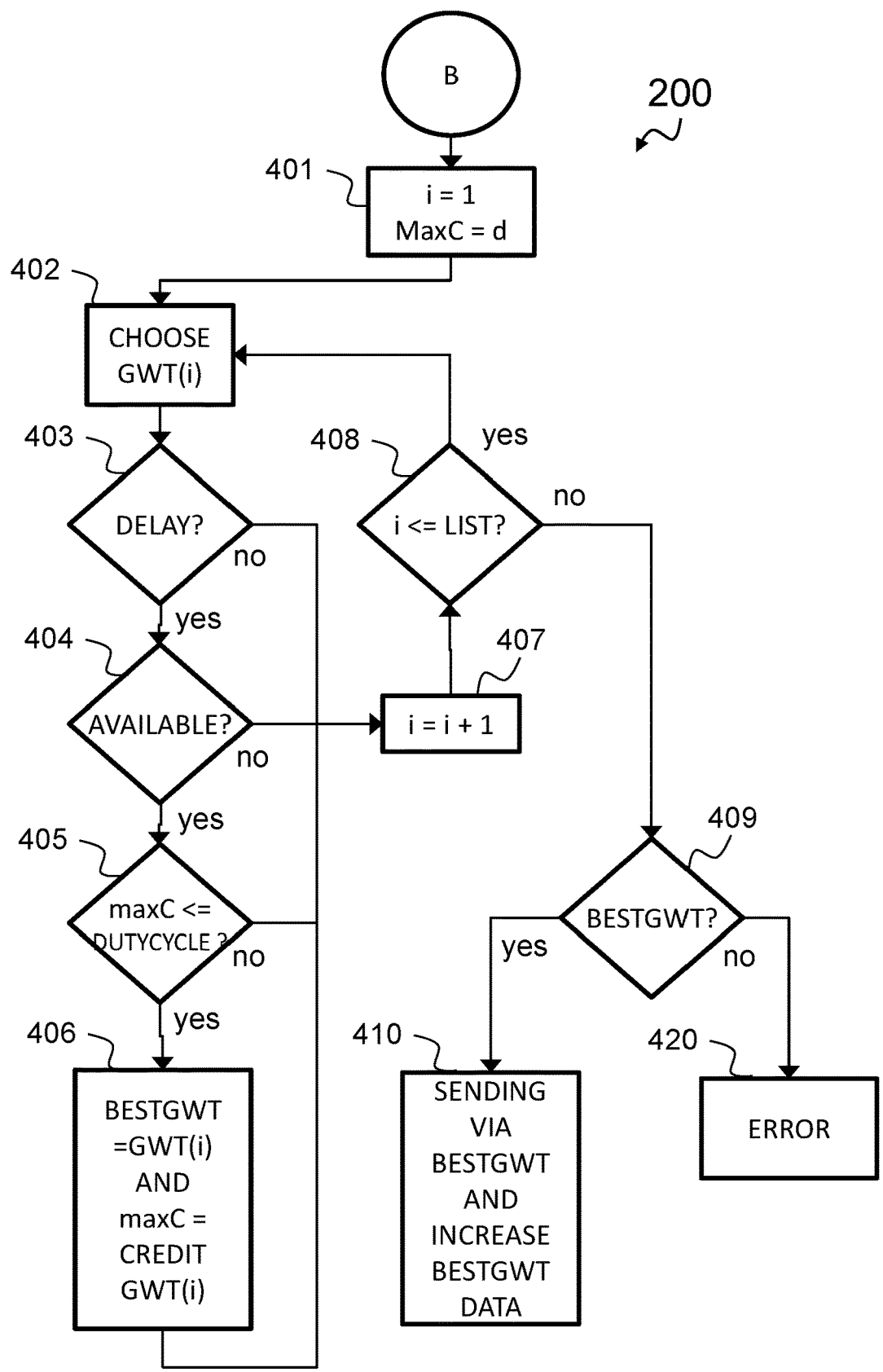

FIGS. 2, 3 and 4 illustrate schematically a method 200 for the selection, by a central server 110 of a so-called long range wide-area network 100, of a gateway among a plurality of gateways 120, 12p, . . . , 12N for sending a frame to an electronic device 101 in response to a frame sent by this electronic device 101, according to the first embodiment of the invention. All or part of the method is executed by the central server 110.

Step 201 corresponds to the initialisation of the central server 110 following for example the powering-up thereof. During this step 201, the central server 110 is adapted for loading into a memory instructions for executing the method 200. During step 201, connections may be established with the gateways 120, 12p, . . . , 12N. The central server 110 may comprise a time synchronisation function enabling gateways among the gateways 120, 12p, . . . , 12N to synchronise themselves timewise. The central server 110 may comprise a time synchronisation relay function. Typically, the central server 110 is an NTP (Network Time Protocol) relay or server enabling the gateways 120, 12p, . . . , 12N connected to the central server 110 to benefit from time synchronisation with the central server 110. The central server 110 can itself synchronise itself with an NTP server (not shown). According to a complementary embodiment, the gateways 120, 12p, . . . , 12N synchronise themselves timewise with an NTP server, possibly the same as the one used by the central server 110 to synchronise itself. According to a complementary embodiment, the gateways 120, 12p, . . . , 12N and/or the central server 110 synchronise themselves timewise via a GPS (Global Positioning System) or Glonass technology.

In a following step 202, the central server 110 is awaiting the reception of a first frame. The first frame corresponds to a first frame sent by the electronic device 101, received by a first gateway among the gateways 120, 12p, . . . , 12N and retransmitted by said first gateway via the central server 110. The frame sent by the electronic device 101 comprises an identifier associated with the electronic device 101, which enables the central server 110 to determine the origin of the frame. Each gateway, when it retransmits a frame, adds in addition to the retransmitted frame an identifier of the gateway. The central server 110 can therefore thus determine which gateway is at the origin of the retransmission of a frame. The frame sent by the electronic device 101 may comprise data corresponding to a priority level of the frame, and/or the priority level of the response expected. Each gateway, when it retransmits a frame, adds in addition to the retransmitted frame a timestamp corresponding to the time of end of sending of the frame by the gateway. By ignoring the time for transmission of the frame between the electronic device 101 and each gateway receiving the frame, the time of end of reception of the frame by the gateway is considered to be an excellent approximation of a time of end of sending of the frame by the electronic device 101 (referred to as "Teum"). It is considered hereinafter that the time of end of sending of the frame "Teum" by the electronic device 101 is taken to be equal to the time of end of reception of the frame by the gateway selected. In other words, as described hereinafter, when the central server 110 executes the method for determining whether a given gateway can or cannot send a frame, the time of end of sending of the frame "Teum") is chosen so as to be equal to the time of end of reception of the frame by said gateway. This time of end of reception by the gateway is therefore hereinafter denoted "Teum". This timestamp (Teum) corresponds to the time of end of reception of the frame by the gateway. Each gateway, when it retransmits a frame, adds an indication on the power of reception of the retransmitted frame, hereinafter referred to as RSSI (Received Strength Signal Indicator). The RSSI may correspond to a measurement of the power of the signal received by the gateway. The RSSI may correspond to the sum of a measurement of the power of the signal received by the gateway, expressed in dBm, and a signal to noise ratio expressed in dB (decibels). The signal to noise ratio, for the frame received, is determined by the gateway receiving the frame. The unit dBm (or decibel milliwatts) corresponds to a power ratio in decibels (dB) between the received power measured and a reference power of 1 milliwatt (1 mW).

A response delay, which defines the delay between the end of sending of a frame by an electronic device and the start of a window where the electronic device 101 listens for any response, can be predefined. This response delay is typically a parameter configured by an operator of the communication network 100. Two or more response delays may be defined, for example "RXDelay1" and "RXDelay2", each response delay corresponding to the opening of a reception window for a predetermined period on the electronic device 101. According to one embodiment of the invention, the response delay is predefined and known to the central server 110. According to an alternative embodiment of the invention, information on the response delay is included in the frame sent by the electronic device 101. When the central server 110 receives the first frame, the central server 110 determines a timestamping of the time of reception of the first frame by the central server 110, for example by taking the time of end of reception of the first frame. This timestamping, by the central server 110, of the time of reception of the first frame, or more precisely of the first received copy of the first frame, is hereinafter denoted "Trfcu".

In a following step 203, the central server 110 extracts data from the first frame received. The central server 110 thus determines whether a response must be made to the first frame received and the priority of said response. In the present example described, two priority levels are considered: "priority" or "non-priority". According to another embodiment, a plurality of priority levels may be defined. Conversely, according to an alternative embodiment, all the frames are treated with the same priority level, corresponding for example to the "priority" level or to the "non-priority" level as described hereinafter. The central server 110 also determines the duration "d" of an expected response, namely the duration of a second frame to be sent in response to the first frame. The central server 110 may, in order to determine the duration of the second frame to be sent in response, determine the response alone or have to connect to another server, in order for example to find information requested or for a computing operation to be performed by a server dedicated to this task.

In the case where a response is expected by the electronic device 101, in a step 204 the central server 110 determines whether the expected response is considered to be priority or not.

In the case where the second frame is non-priority, the central server 110 passes to step 205. In the case where the second frame is priority, the central server 110 passes to step 206.

In step 205, the central server 110 compares the RSSI of the received frame with a predetermined threshold. If the RSSI is lower than the threshold, then the frame is ignored. Thus, in the case where the RSSI is higher than the predetermined threshold, the central server 110 passes to step 206. In the case where the RSSI is lower than the predetermined threshold, the central server 110 passes to step 207. In other words, in the case of a non-priority response, the first frames received with a low RSSI are not taken into account, namely a gateway that has received a first frame with an excessively low RSSI (namely below the predetermined threshold) cannot then be selected for sending a response.

In a step 206, the central server 110 records in memory the identifier of the gateway that retransmitted the first frame in association with the identifier of the electronic device 101. In other words, the central server 110 creates or completes a list, in association with the electronic device 101, comprising the identifier of the gateway that retransmitted the first frame. The list may comprise, in association with the identifier of each gateway, the RSSI corresponding to the first frame received by the gateway. The central server 110 may manage a plurality of lists in parallel, each list corresponding to a different electronic device. When step 206 is iterated, the central server 110 may complete the list, for an electronic device 101, with an identifier corresponding to a gateway that retransmitted the first frame to the central server 110. Possibly, when the list is updated by the central server 110, the central server 110 may order the list according to a predetermined criterion. Possibly, the elements constituting the list are ordered in accordance with a decreasing RSSI criterion. The first element of the list then corresponds to a gateway that received the first frame with the highest RSSI. The first element of the list therefore, a priori, corresponds to a gateway having the best quality of communication with the electronic device 101.

In a following step 207, the central server 110 determines the time elapsed since the time of reception of the first frame, during step 202, and the current or present time of the central server 110. If this elapsed time is greater than a predefined delay, referred to as "LNS time", then the central server 110 passes to step 209. Otherwise the central server 110 passes to step 208.

During step 208, the central server 110 awaits the reception of a copy of the first frame sent by the electronic device 101 and retransmits by another gateway. According to an alternative embodiment, the central server 110 awaits any frame sent by the electronic device 101, without necessarily the frame being the first frame. If a new frame is received, then the central server 110 recommences the method at step 204, namely at step 206 in the case of a priority frame and at step 205 in the case of a non-priority frame. Otherwise the central server 110, during step 207, checks that the "LNS time" delay has not elapsed. Thus, by iterating steps 208, 204 and optionally 205, 206 and 207, the central server 110 forms a list associated with the identifier of the electronic device, the list comprising the various gateways that retransmitted the first frame, or a copy of the first frame. These gateways constitute the candidate gateways for the selection of a gateway for the sending of a second frame in response to the first frame.

It should be noted that, in the case of a non-priority frame, the list may, after the expiry of the "LNS time" delay, be empty. In this case, no response will be given to the first frame. This is the case if all the examples of the first frame have been received with an excessively low RSSI (namely below a predefined threshold). Indeed, for reasons of preservation of the bandwidth, it can be considered that it is unnecessary, for a non-priority frame, to send a frame in response to the electronic device 101 if no gateway has received the first frame with a sufficient RSSI, the frame sent in response having little chance of being correctly received whatever the gateway selected.

In the case of a priority frame, the list always at a minimum comprises the gateway that retransmitted the first frame during step 202, plus optionally other gateways if other copies of the first frame have been received during step 208.

In the case of a non-priority frame, the list may comprise the gateway that retransmitted the first frame during step 202, and optionally other gateways if other copies of the first frame had been received during step 208, only those for which the RSSI is higher than a predefined threshold being retained in the list.

After the expiry of the "LNS time" delay, the central server 110 passes to step 209.

In step 209, the central server 110 determines whether the second frame to be sent in response to the first frame is priority. If so, the central server 110 passes to step 301, the remainder of the steps being described in FIG. 3. If not, the central server 110 passes to step 401, the remainder of the steps being described in FIG. 4.

In both cases, the central server 110 can access data for planning of the sending of frames by a gateway, and this for each gateway 120, 12p, . . . , 12N. These data are for example recorded in a memory of the central server 110. Possibly, these data are recorded on each gateway 120, 12p, . . . , 12N, the central server 110 being able to find these data on each gateway 120, 12p, . . . , 12N. These data for planning of sending of a frame by the gateway "p" may correspond to a list "ListTrx" and to a list "Listd", each list being associated with said gateway. The central server 110, for each gateway 120, 12p, . . . , 12N, keeps a list (or matrix) "ListTrx" and a corresponding list (or matrix) "Listd". The list "ListTrx" corresponds to a list of the times of sending of planned frames for the sending by the gateway and the list "Listd" comprises, for each planned frame in the list "ListTrx", a time of sending of said frame. In other words, for each gateway 120, 12p, . . . , 12N, the central server 110 keeps two lists up to date. The first list, "ListTrx", comprises the times of sending of the frames that the gateway must send, and, in a second list "Listd", the time of sending of said frame. Thus the central server 110 keeps up to date, for each gateway 120, 12p, . . . , 12N, the planning of the frames to be sent. Thus, for a given gateway, "ListTrx(j,k)" corresponds to the time of sending of the "$j^{th}$" frame to be sent on the frequency sub-band "k" by said gateway and "Listd(j,k)" to the duration of said "$j^{th}$" frame for the frequency sub-band "k". The central server 110 records as many pairs of lists "ListTrx" and "Listd" that there are gateways 120, 12p, . . . , 12N, namely here "N" pairs of lists "ListTrx" and "Listd". Each pair corresponds to the planning data for sending of frames of a given gateway. Likewise, the list (or vector) comprising all the times of sending of the planned frames on the frequency sub-band "k" is denoted "ListTrx (k)". Also the list (or vector) of the durations of transmission of all the frames planned on the frequency sub-band "k" is denoted "Listd(k)".

In the case where the second frame to be sent in response to the first frame is priority, the central server 110 executes steps 301 to 310 or 320 of the method 200 illustrated in FIG. 3. These various steps, described below, make it possible to choose at least one gateway the identifier of which is included in the list, and, for this gateway:

to find the planning data for sending of frames by said gateway, to check whether selection criteria that are dependent on the moment of sending and the duration of the second frames, as well as planning data for sending of frames of the gateway, are met, and, if the selection criteria are met, then the central server 110 selects said gateway for sending the second frame in response to the second frame to the electronic device.

Thus, in a step 301, the central server 110 initialises a counter "i" to the value 1.

In a following step 302, the central server 110 chooses the gateway "i" in the list drawn up at step 206. In other words, at the first iteration, "i" being equal to "1", the central server 110 chooses the first gateway in the list. Possibly this first gateway is the one having the highest RSSI as described previously. The central server 110 finds, for the gateway "i", planning data for sending of frames by the gateway "i". These frame-sending planning data correspond for example to the pair "ListTrx" and "Listd" for the gateway "i".

In a following step 303, the central server 110 determines whether there remains sufficient time for the second frame to be sent to be transmitted to the gateway "i" for sending. For this purpose, the central server 110 determines the following sum "S":

$$S = Trfcu + LNS\ time + method\ time + transmission\ time,$$

with:

"Trfcu": parameter corresponding to the timestamping, by the central server 110, of the time of reception of the first frame, or more precisely of the first received copy of the first frame, "LNS time": parameter corresponding to a predefined delay of waiting for the reception of any copies of the first frame; corresponds to the test of step 207, "method time": parameter corresponding to a predefined delay. This predefined delay corresponds to an estimation, possibly increased, of the time for execution of the method 200, from which the "LNS time" delay is subtracted (in order not to count it twice). In other words, the estimated time of the method of selecting a gateway once the "LNS time" delay has expired, "transmission time": parameter corresponding to the transmission time for a frame sent by the central server 110 to the gateway "i".

The "Trfcu" timestamping is determined during step 202. The "LNS time" is predefined. "Method time" is an estimation of the time necessary for executing the method of selecting a gateway once step 209 has been reached. "Transmission time" corresponds to the time necessary for a second frame to be transmitted from the central server 110 to the gateway "i". In other words, "transmission time" corresponds to the duration of travel of a second frame from the central server 110 to the gateway "i". According to the embodiment, the parameter "transmission time" may correspond to an average value of the travel time between the central server 110 and the gateway "i". This average value can be determined using a timestamping of acknowledgement frames sent by the gateway "i" when the central server 110 sends a frame. The central server 110 can then determine a round trip time by taking the difference between a timestamp of the time for sending a frame and a timestamp of a frame received in acknowledgement. The central server 110 can determine a weighted or exponential moving average of the travel times in order ultimately to determine a "transmission time" for each gateway "i". A default value may be used.

The sum "S" corresponds to an estimation of the closest possible moment of sending by the gateway "i" of the second frame. It is therefore necessary to ensure that this closest moment of sending is indeed prior to the time of opening the reception window for the electronic device 101. Once the sum "S" of these parameters has been determined, the central server 110 therefore compares this sum "S" with the timestamp of the time of opening the reception window of the electronic device 101, hereinafter referred to as "Trx", an estimation of which is given by:

$$Trx = Teum + RXDelay, \text{ with:}$$

"Teum": time of end of reception of the frame by the gateway "i", which is used in the method as being an estimation of the time of end of sending of the first frame by the electronic device 101. Indeed, this time of end of sending of the first frame by the electronic device 101 is not directly known.

"RXDelay": response time, previously described.

According to a complementary embodiment of the invention, several values of the response time "RXDelay1" and "RXDelay2" can be used by the method 200. The method 200 must therefore be executed for a first time with the value of the response time equal to "RXDelay1" (the value of "RXDelay1" being less than that of "RXDelay2"), and then, if no gateway can be selected (namely step 320 or 420), the method 200 must be resumed as from step 209 with the value of the response time equal to "RXDelay2" instead of "RXDelay1". Several values of the response time can thus possibly be used, the method being resumed at step 209 with a new response time if no gateway can be selected for a given value of the response time.

If the sum "S" is less than "Trx", this means that a second frame can indeed be sent to the gateway "i" for sending on time so that the gateway can send the second frame at the opening of the reception window of the electronic device 101.

If the sum "S" is greater than "Trx", this means that a second frame cannot be sent to the gateway "i" for this frame to be able to be sent on time for the opening of the reception window of the electronic device 101. In other words, the gateway "i" is not yet in a position to send the second frame in the reception window of the electronic device 101, the central server 110 not being in a position to transmit it on time.

It should be noted that the value of "LNS time", corresponding to the predefined waiting time for the reception of any copies of the first frame, is predefined and chosen so that a "transmission time" of average length can allow the sending of a second frame to a gateway in time.

Step 303 therefore makes it possible to check whether, on the assumption that the gateway "i" is selected at the end of the method 200, the central server 110 can indeed transmit the second frame to said gateway "i" in time for the gateway "i" to be able to send the second frame during the reception window of the electronic device 101.

If such is not the case, this means that the gateway "i" cannot be selected and the central server 110 passes to step 306. If such is the case, the central server 110 passes to step 304 in order to check another condition for the gateway "i" to be selected.

In step 304, described in detail hereinafter in FIG. 6, the central server 110 determines whether the gateway "i" is in a position to send a second frame during the reception window of the electronic device 101. In this step 304, the central server 110 checks that no other frame already planned for sending by the gateway "i" on any frequency comes into collision or overlaps with the second frame. In other words, the central server 110 checks that it is possible to insert the second frame in the frame planning data without causing a collision between two frames. Collision means, at a given time, the need to send two different frames by the same gateway, which cannot be managed by said gateway.

If the second frame does not come into collision with a frame previously planned for sending by the gateway "i", then the central server 110 passes to step 305. In the contrary case, this means that the gateway "i" cannot be selected and the central server 110 passes to step 306.

In step 305, the central server 110 determines whether the planning of the second frame for sending by the gateway "i" enables said gateway to comply with any duty cycle that might be imposed on the frequency of sending to be used for sending the second frame. In other words, during this step 305, the central server 110 checks that the gateway has sufficient time in terms of duty cycle to send the second frame of duration "d". This step 305 is described below in more detail in FIG. 7. If the central server 110 determines that the planning for sending the second frame does not call in question the compliance by the gateway "i" with a duty cycle, then the central server 110 passes to step 310. Otherwise this means that the gateway "i" cannot be selected and the central server 110 passes to step 306.

During step 310, the central server 110 selects the gateway "i" for sending the second frame in response to the first frame sent by the electronic device 101. The frame-sending planning data for the gateway "i" are updated in order to include the data relating to the second frame, namely:

insertion of the second frame in the lists "ListTrx" and "Listd" at a position "j" corresponding to the planned sending time, namely between a frame planned previously and a frame planned subsequently, if such exist, "ListTrx(j,k)", with "j" corresponding to the position of the frame, a position dependent on the planned sending time, and "k" corresponding to the frequency sub-band comprising the frame sending frequency, has the value "Trx" (namely "Teum+RXDelay"), "Listd(j,k)", with "j" corresponding to the position of the frame, a position dependent on the planned sending time, and "k" corresponding to the frequency sub-band comprising the frame sending frequency, has the value "d".

The method 200 ends after step 310. The method 200 is executed once again when a new first frame from the electronic device 101 is received. Another instance of the method 200 can be executed by the central server 110 if the latter receives a first frame from another electronic device. It is then necessary to select in parallel another gateway, possibly the same, for the possible sending of a response to the other electronic device.

In the case where one of the constraints satisfied during steps 303, 304 and 305 is not satisfied by the central server 110, the central server 110 passes to step 306. Step 306 corresponds to the incrementation of the value of "i", namely at the choice of the following gateway in the list established during step 206. Step 307 corresponds to a check that there does indeed remain a gateway to be checked (steps 303, 304 and 305) in the list. If all the gateways in the list have been reviewed by the central server 110, namely if "i" is greater than the number of elements in the list, then the central server 110 passes to step 320. Otherwise the central server 110 resumes the method 200 at step 302 with the following gateway in the list in order to check whether this gateway meets the constraints satisfied during steps 303, 304 and 305. It should be noted that not all the gateways are necessarily checked (namely the central server 110 does not execute steps 303 to 305) provided that a gateway meets the constraints. The method therefore allows rapid selection of the gateway.

Step 320 corresponds to the end of the method 200, no gateway having been selected. The central server 110 cannot then send a second frame. Possibly the central server 110 records in a log the failure of the selection of a gateway. An error message may be sent to a server.

Thus, in the case where the list of gateways established during step 206 is ordered in decreasing order of the associated RSSIs, the method detailed in FIG. 3 makes it possible to select the gateway meeting the sending constraints and having the best RSSI for sending the second frame. This method is used by the central server 110 for selecting a gateway for sending a priority frame.

FIG. 4 details the remainder of the method 200, after step 209, when the frame to be sent is non-priority. The method detailed in FIG. 4, intended for the case of a non-priority frame, is distinguished from the method detailed in FIG. 3, intended for the case of a priority frame in that all the gateways included in the list are checked, and in that the gateway ultimately selected is the one meeting the sending constraints and having the greatest credit in terms of duty cycle, namely where the duty cycle value is the highest at the moment of sending. It should also be noted that the list established during step 206 does not include a gateway the RSSI of which is lower than a predefined value (step 205) in the case of a non-priority frame.

In a step 401, following step 209, in the case of a non-priority frame, the central server 110 defines a variable "i", initialised with the value "1", and a variable "maxC", initialised with the value "d", corresponding to the duration of the second frame to be sent. The central server 110 next passes to step 402.

In step 402, the central server 110 finds the frame sending planning data for the gateway "i". The central server 110 next passes to step 403.

Step 403 is similar to step 303. During this step, the central server 110 determines whether the central server 110 is in a position to transmit the second frame in time to the gateway "i". The description of step 303 applies mutatis mutandis. If the central server 110 is in a position to transmit the second frame to the gateway "i" in time, the central server 110 passes to step 404. Otherwise the central server 110 passes to step 407.

Figure 6:
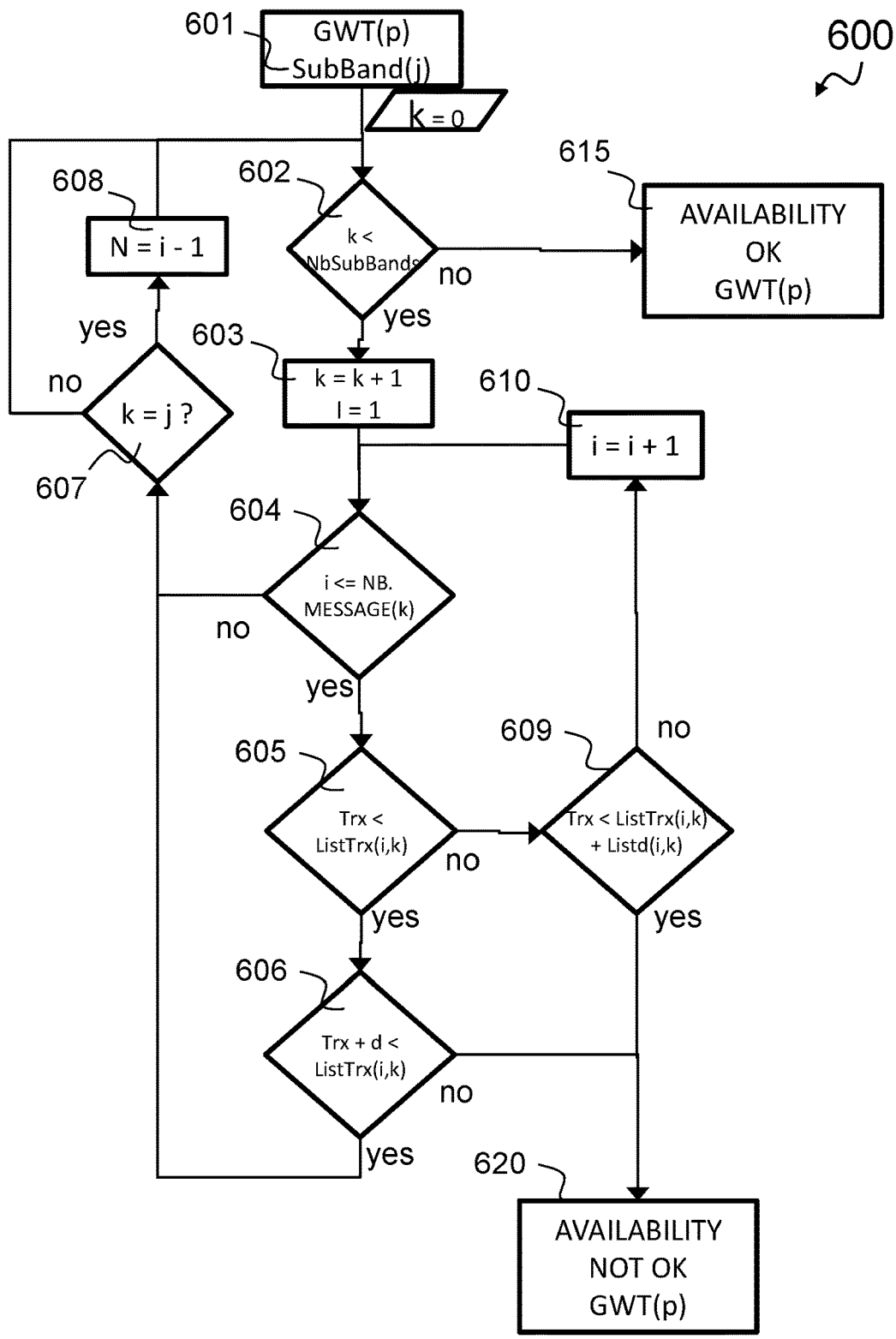
FIG. 6 illustrates schematically a method for checking that a frame to be sent can be inserted in the planning of frames to be sent from a gateway, according to the first embodiment of the invention.

Step 404 is similar to step 304 and is described in more detail in FIG. 6. During this step, the central server 110 determines whether the central server 110 is in a position to plan the sending of the second frame by the gateway "i" without causing any frame-sending collision with a previously planned frame. If such is the case, the central server 110 passes to step 405. Otherwise the central server 110 passes to step 407.

Figure 7:
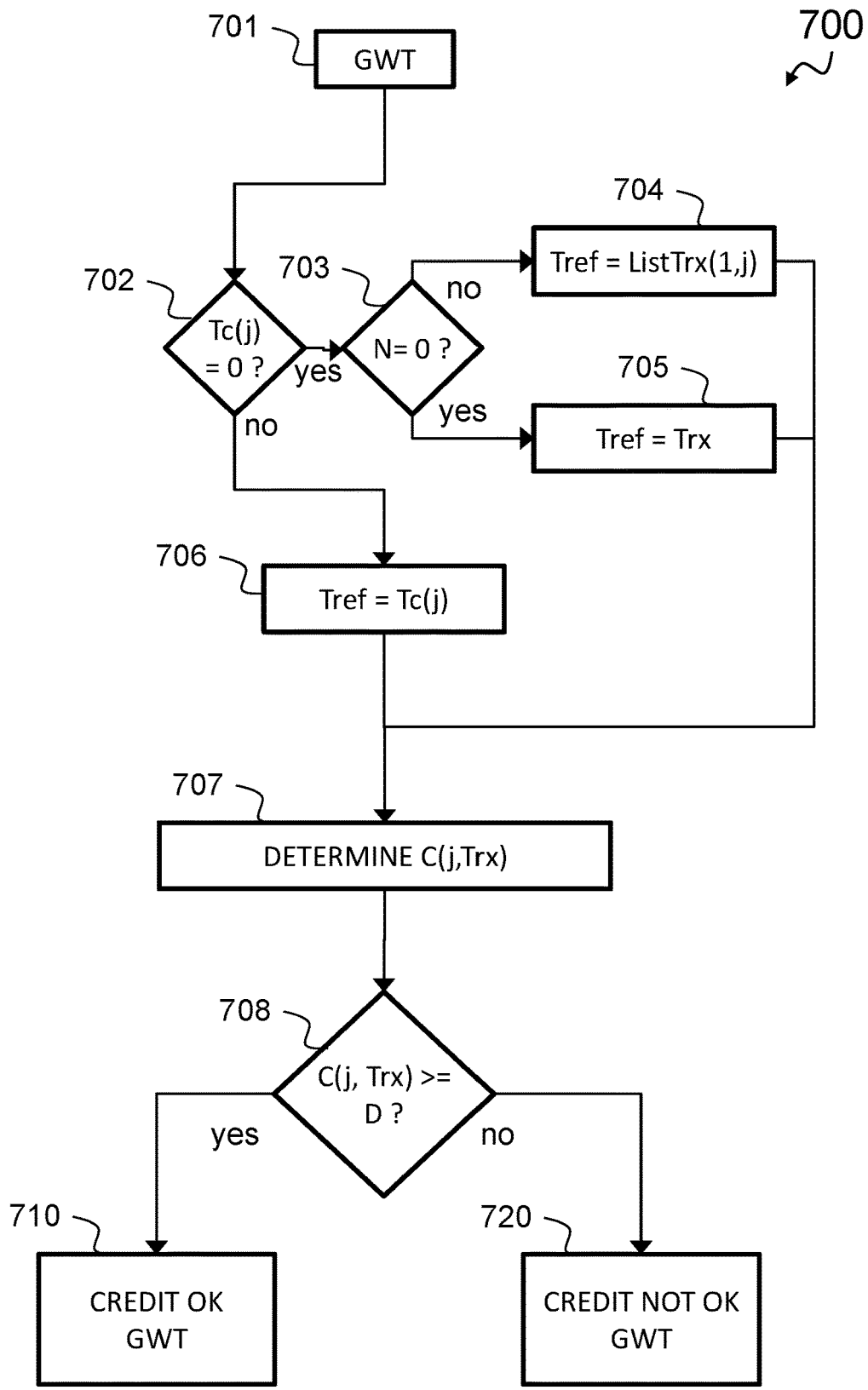
FIG. 7 illustrates schematically a method for checking compliance of a duty cycle for the planning of sending of a frame by a gateway, according to the first embodiment of the invention.

Step 405 is similar to step 305 and is described in more detail in FIG. 7, with the exception of the test performed by the central server 110 as the final step. During this step, the central server 110 determines whether the gateway is in a position to send the second frame while complying with any duty cycle. However, in order ultimately to select the gateway "i" that has the largest possible duty cycle credit at the end of steps 402 to 409, the central server 110 compares the value of "maxC" with the duty cycle of the gateway "i" at the end of step 405. Thus the gateway "i", during step 406, becomes the possible candidate to be the gateway selected by the method 200 only if it has a duty cycle credit higher than the duty cycle credit of the previous gateway that was a candidate to be selected, said credit being stored in the variable "maxC". The previous gateway that was a candidate for being selected is the one the identifier of which is stored in the variable "BestGwt". If the duty cycle credit of the gateway "i" ("C(j, Trx)", with "j" corresponding to the frequency sub-band comprising the frequency on which the second frame is to be sent, as described below) is higher than the duty cycle credit of the previous gateway that was a candidate for being selected, namely "maxC", the central server 110 passes to step 406. Otherwise the central server 110 passes to step 407.

In a step 407, the variable "i" is incremented ("i=i+1"). The central server 110 next passes to step 408 in order to check that the value of "i" has not exceeded the number of elements included in the list. If "i" corresponds to a gateway in the list, then the central server 110 resumes the method at step 402 with the new value of the variable "i". In other words, steps 403 to 405 or 406 are repeated for the following gateway in the list. If the value exceeds the number of elements in the list, this indicates that all the gateways in the list have passed through steps 402 to 405 or 406. The central server 110 then passes to step 409.

In step 406, the central server 110 keeps in memory the gateway "i", the latter being a candidate for becoming the gateway selected. In other words, the central server 110 keeps in memory, in a variable "BestGwt", the identifier of the gateway "i". During this same step, the central server 110 updates the variable "maxC" with the value of the duty cycle calculated during step 405 for the gateway "i" for the carrier frequency "j" (or sub-band if the carrier frequencies are grouped in sub-bands) at the planned sending time "Trx" of the second frame. In other words, "maxC C(j, Trx)", with:

"C" the duty cycle function for the given gateway "i",

"j" the sub-band in question, the sub-band "j" comprising the sending carrier frequency of the second frame, and "Trx" the sending time of the second frame, namely the time of opening of the reception window of the electronic device 101.

In a step 408, the central server 110 determines that all the gateways in the list have passed through steps 402 to 405 or 406, meaning that the central server 110 has executed these steps for all the values of "i" corresponding to an element in the list. The central server 110 then passes to a step 409.

In step 409, the central server 110 determines the value of the variable "BestGwt", which then corresponds to the identifier of the gateway among all the gateways in the list which:

meets the frame sending constraints (non-collision, second frame transmitted on time and duty cycle sufficient), and is associated with the largest duty cycle credit.

The latter criterion makes it possible, for a non-priority frame, to select the gateway able to send the second frame having the largest credit in terms of duty cycle, this criterion being strict. The gateways with little duty cycle are therefore preserved. Thus, if the variable "BestGwt" comprises the value of an identifier of a gateway, then, in a step 410, similar to step 310 described previously, the gateway corresponding to this identifier is selected. Otherwise, in a step 420, similar to step 320, the central server 110 is not in a position to select a gateway; an error message is generated.

According to a complementary embodiment of the invention, and in order to simplify the implementation of the method 200, all the second frames are considered to be "priority". The method 200 is simplified since steps 204, 205, and 401 to 420 are not executed by the central server 110. Alternatively, the method 200 is simplified by considering all the second frames as being "non-priority". The method 200 is then simplified since steps 204 and 301 to 320 are not executed by the central server 110.

Figure 5:
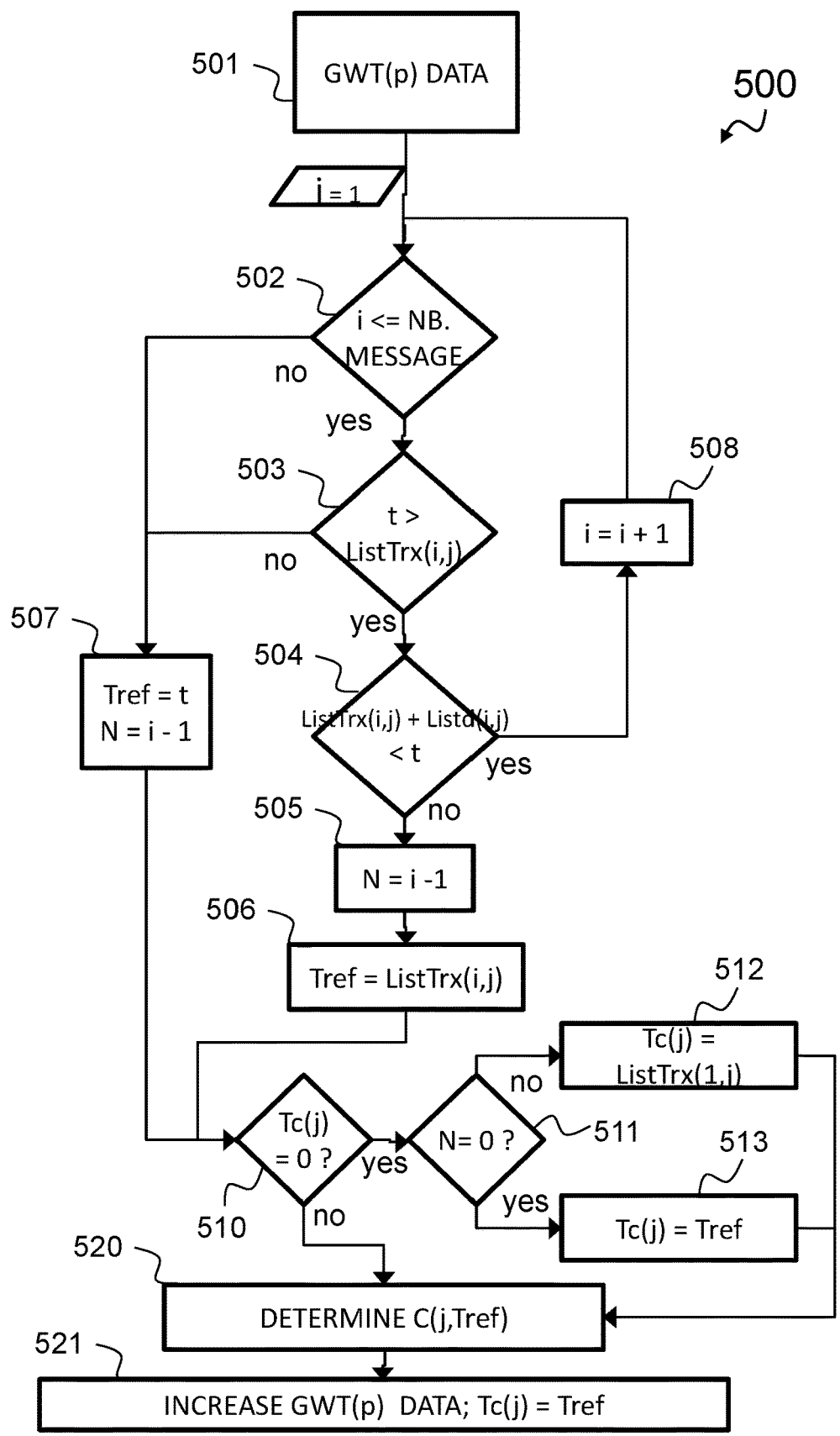
FIG. 5 illustrates schematically a method for updating planning data for the sending of frames for a gateway included in a communication network known as a "long range wide-area network", according to the first embodiment of the invention.

FIG. 5 illustrates schematically a method 500 for updating frame-sending planning data for a gateway among the gateways 120, 12p, . . . , 12N included in a communication network 100 known as a long range wide-area network, according to one embodiment of the invention. This method is executed periodically or on demand by the central server 110 in order to update the duty cycle for a gateway and for a frequency sub-band "j". This method takes as its argument the current time "t", the last value determined of the duty cycle "C(j, Tc(j))" with:

"C" duty cycle function for the given gateway,

"j" the frequency sub-band, and

"Tc(j)" the last reference time used for the given gateway and for the frequency sub-band "j".

In general terms, the duty cycle at a given instant "T+t" with respect to the duty cycle at time "T" is expressed by:

$$C(j,T+t)=\min(C0(j);C(j,T)+t-(2-DC(j))\cdot\Sigma_{k=1}^{N} \text{List}d(k,j)), \text{with:}$$

"C(j,t)" the duty cycle for the sub-band "j" at time "t",

"min (a,b)" function selecting the minimum value between the arguments "a" and "b", "C0(j)" a maximum duty cycle credit, expressed for an arbitrary reference period of one hour (3600 seconds). This therefore gives:

"$C0(j)=3,600,000*DC(j)$";

with C0(j) expressed in ms (milliseconds), "j" the frequency sub-band and DC(j) the duty cycle to be complied with for the sub-band "j", expressed as a percentage ("%"). Thus, for DC(j)=10% (duty cycle of 10% to be complied with on the sub-band "j"), the maximum duty cycle credit "C0(j)" is equal to 360,000 ms (namely 6 minutes for a reference time of one hour);

"DC(j)" is the duty cycle to be complied with, namely the ratio between the sum of the frame-sending times and the time of non-sending of the gateway for the carrier frequencies included in the sub-band "j"; DC(j) is expressed as a percentage;

"Listd(k,j)" has been described previously and corresponds to the duration of sending, by the gateway in question, of a planned frame "k" on the frequency sub-band "j";

"N" corresponds to the total number of planned frames for sending by the gateway in question on the sub-band "j" during the time range lying between "T" and "T+t". Possibly only the frames where the time of start of sending and the time of end of sending lie in the time range lying between "T" and "T+t" are taken into account.

Step 501 corresponds to the loading of the data corresponding to the gateway the duty cycle of which for the sub-band "j" it is wished to update in the memory of the central server 110. These data can be recorded on the central server 110 itself. The value of a variable "i" is initialised to "1" before passing to step 502.

In step 502, the central server 110 determines whether "i" has exceeded the number of elements included in the list "ListTrx(j)" comprising all the frames planned for the gateway in question on the sub-band "j". If "i" is less than the number of frames planned, then the central server 110 passes to step 503. Otherwise it passes to step 507.

In step 503, the central server 110 determines whether the current time "t", corresponding to the local time of the central server 110, possibly synchronised via NTP, is less than the planning time for sending of the frame "i". If the frame is planned for subsequent sending or sending simultaneous with the current time "t", namely if "t<=ListTrx(i, j)", then the central server 110 passes to step 507. If on the other hand "t>ListTrx(i,j)", then the central server 110 passes to step 504.

Step 503 makes it possible to determine whether the current time "t" may correspond to a moment of sending a frame "i". Step 504 makes it possible to ensure that the current time is subsequent to the end of sending of the frame "i". In other words, if "ListTrx(i,j)+Listd(i,j)<t", then the current time "t" is subsequent to the end of sending of the frame "i", sent at time "ListTrx(i,j)"; and having a duration of sending "Listd(i,j)". The central server 110 then passes to step 508 in order to increment the value of "i" by "1". Then, following step 508, the central server 110, after having checked in a new step 502 that the number of frames has not been exceeded, recommences step 503 with the following frame. If on the other hand "ListTrx(i,j)+Listd(i,j)>=t", knowing that the central server 110 determined, during step 503, that "t>ListTrx(i,j)", this means that the current time "t" corresponds to a moment of sending of the frame "i". In this case, in a following step 505, the central server 110 stores "N=i−1". Then, in a step 506, the central server 110 defines a variable "Tref" corresponding to a reference time for calculating the duty cycle, with "Tref=t". In other words, in step 506, the central server 110 defines the reference time "Tref" as being equal to the time "ListTrx(i,j)" corresponding to the sending of the frame "i". The $N^{th}$ frame in the list "ListTrx(j)" corresponds to the last frame planned for sending by the gateway in question before the reference time "Tref". Thus it will be necessary to consider these N frames for calculating the duty cycle.

During step 507, the reference time "Tref" is defined equal to the current time "t". This corresponds to a situation where the current time does not correspond to a moment of sending of a frame "i".

Following steps 506 and 507, the central server 110 passes to step 510. During step 510, the central server 110 determines the value of the variable "Tc(j)". "Tc(j)" corresponds to the reference time "Tref" used during the previous iteration of the updating method 500 for the gateway in question for the sub-band "j", as described below in the description of step 512. During the first iteration of the method 500, the value of "Tc(j)" is initialised to "zero", the default value. In this case, if "Tc(j)=0" then the central server 110 passes to step 511 in order to determine whether frames are planned for sending before the reference time. In other words, if N=0, then, in a step 513, the central server 110 defines "Tc(j)=Tref". In other words, no frame being planned for sending before the reference time "Tref", the value of "Tc(j)" can be fixed at "Tref" without modifying the value of the duty cycle, since the latter is already at its maximum value. If on the other hand N is different from "zero", this means that it is necessary to take account of the frames to be sent for calculating the duty cycle and, in a step 512, the central server 110 defines "Tc(j)=ListTrx(1, j)" in order to start the calculation of the duty cycle at the sending of the first frame.

Following step 512 or 513, or, if in step 510 "Tc(j)" is different from "zero", the central server 110 passes to step 520. Step 520 corresponds to the step of calculation of the duty cycle "C(j, Tref)":

$$C(j, Tref) = \min(C0(j); C(j, Tc(j) + Tref - Tc(j) - (2 - DC(j)) \cdot \sum_{k=1}^{N} Listd(j, k))$$

In a following step 512, the central server 110 updates the frame-sending planning data for the gateway in question for the frequency sub-band "j". This updating comprises the deletion of the first N elements in the lists "ListTrx(j)" and "Listd(j)" for the sub-band "j". The central server 110 stores the reference time and the duty cycle for this reference time for a future iteration, namely:

"Tc(j)" takes the value "Tref", and

"C(j, Tc(j))" takes the value "C(j,Tref)", for a subsequent use of these two updated values of "Tc(j)" and of "C(j, Tc(j))" in a new iteration of the method 500 for the gateway in question for the sub-band "j".

FIG. 6 illustrates schematically a method 600 for checking that a frame to be sent can be inserted in the planning for frames to be sent of a gateway among the gateways 120, 12p, . . . , 12N, according to one embodiment of the invention.

The method 600 illustrated in FIG. 6 corresponds to steps 304 or 404 of the method 200 for a gateway "p" that has to plan the sending of a frame on a frequency lying in a frequency sub-band "j".

In a step 601, the central server 110 finds the frame-sending planning data for the gateway in question for each frequency sub-band, including the frequency sub-band "j". These data were possibly previously found by the central server 110 during step 302 or 402. During this step, a variable "k" is initialised to the value "zero".

In a step 602, the central server 110 determines whether the variable "k" is lower than the number of frequency sub-bands used by the gateway "p" ("NbSub-bands" for the gateway "p" in FIG. 6). If "k" is higher than this value, this means that all the frequency sub-bands have been checked without an overlap having been detected, and the central server 110 then passes to step 615. Otherwise, if "k" is lower than the number of frequency sub-bands used by the gateway "p", the central server 110 passes to step 603.

In a step 603, the central server 110 increments the value of the variable "k" by "1" and initialises or reinitialises the value of a variable "i" to "1". The central server 110 passes to a test 604.

During step 604, the central server 110 checks whether "i" is less than the number of frames planned for sending on the frequency sub-band "k", namely less than the number of elements in the list "ListTrx(k)" for the gateway "p". If so, the central server 110 passes to step 605, otherwise to step 607.

In step 605, the central server 110 determines whether the time of sending of the second frame "Trx" is less than the sending time "ListTrx(i,k)" of the planned frame "i" for the frequency sub-band "k". If so, the central server 110 passes to step 606, otherwise it passes to step 609. If "Trx" is less than the time for sending the planned frame "i" for the frequency sub-band "k", this means that the second frame must be sent before the frame "i". It is then necessary to check thereafter whether the delay between the time "Trx" and the start of the sending of the frame "i" for the frequency sub-band "k" is sufficient for sending the second frame, knowing that the duration of sending of the second frame is "d".

This check is carried out during step 606. Thus, if Trx+d" is greater than "ListTrx(i,k), then there is not a sufficient delay for the sending of the second frame before the planned sending of the frame "i" for the frequency sub-band "k", and the central server 110 passes to step 620. Step 620 corresponds to the fact that the gateway in question "p" is not available for sending the second frame. The method 200 then continues with step 306 in the case of a second priority frame, and with step 407 in the case of a second non-priority frame.

Following step 606, if "Trx+d" is less than "ListTrx(i,k)", this means that the delay between "Trx" and the start of the sending of the frame "i" for the frequency sub-band "k" is sufficient for sending the second frame of duration "d". The central server 110 then passes to step 607.

During step 607, the central server 110 determines whether the value of the variable "k" is equal to "j", "j" corresponds to the sub-band "j" comprising the sending frequency of the frame to be planned. If such is the case, the central server 110 passes to step 608, otherwise directly to step 602.

During step 608, the central server 110 stores, for a variable "N", the value "i=1", "N" corresponding to the last frame planned for sending on the sub-band "j" before the second frame, or, in other words, to the planned frame, on the sub-band "j", having to be sent just before the second frame. The central server 110 next goes to step 602 again.

During step 609, the central server 110 determines whether the time of sending of the second frame "Trx" corresponds to a moment during which the gateway is planned for sending the frame "i" for the frequency sub-band "k" of duration "Listd(i,k)". If "Trx" is less than "ListTrx(i,k)+Listd(i,k)", knowing from step 605 that "Trx" is greater than "ListTrx(i,k)", then "Trx" corresponds to a moment of sending of the frame "i" for the frequency sub-band "k", and the central server 110 passes to step 620. If not, the central server 110 passes to step 610, corresponding to the incrementation of the variable "i", with "i=i+1", and then goes to step 604 again.

FIG. 7 illustrates schematically a method 700 for checking compliance of a duty cycle for planning the sending of a frame by a gateway, according to one embodiment of the invention.

The method 700 illustrated in FIG. 7 corresponds to steps 305 to 405 of the method 200.

In a step 701, the central server 110 finds the planning data for the sending of frames for the gateway in question and the sub-band "j". These data were possibly previously planned by the central server 110 during step 302 or 402.

The central server 110 finds the value of the variable "Tc(j)" as defined during the description of FIG. 5, step 510 et seq. "Tc(j)" corresponds to the last reference time used for the given gateway of value for the last update of its duty cycle on the sub-band "j". The central server 110 also finds the value of "N" as determined during steps 304 or 404, as described in FIG. 6, step 608.

In a step 702, if "Tc(j)=0", then the central server 110 passes to step 603, otherwise it passes to step 706. In step 703, if "N=0", then the central server 110 passes to step 705, otherwise it passes to step 704.

In step 704, the central server 110 defines the reference time "Tref" as being equal to "ListTrx(1, j)" and then the central server 110 passes to step 707.

In step 705, the central server 110 defines the reference time "Tref" as being equal to "Trx" and then the central server 110 passes to step 707.

During step 706, the central server 110 defines the reference time "Tref" as being equal to "Tc(j)". Then the central server 110 passes to step 707.

Steps 702 to 706 obey the same logic as steps 510 to 513.

In step 7107, the central server 110 determines the duty cycle at the time of sending of the second frame "Trx", with:

$$C(j, Trx) = \min(C0(j); C(j, Tc(j) + Trx - Tref - \left(2 - DC(j) \cdot \sum_{k=1}^{N} Listd(k, j)\right)$$

"C(j,Trx)" is the duty cycle at the moment "Trx" for the sub-band "j". In other words, C(j,Trx) represents the duty cycle credit available at the moment "Trx" for the given gateway and for the sub-band "j". This credit represents a time available for the sending of frames on the sub-band "j" by the gateway concerned.

If this credit C(j,Trx) is greater than "d", then the gateway concerned has sufficient credit to send the second frame. The method 200 continues with step 301 in the case of a second priority frame, and with step 406 in the case of a second non-priority frame. In the case of a non-priority frame, step 708 is modified in that the comparison of the duty cycle credit is carried out with the variable "maxC" rather than with "d" in order ultimately to select the gateway having the greatest duty cycle credit.

In the contrary case, the gateway does not have sufficient credit for sending the second frame. The method 200 continues with step 306 in the case of a second priority frame and with step 407 in the case of a second non-priority frame. In the case of a non-priority frame, step 708 is modified in that the comparison of the duty cycle credit is made with the variable "maxC" rather than with "d" in order ultimately to select the gateway having the greatest duty cycle credit.

Figure 8:
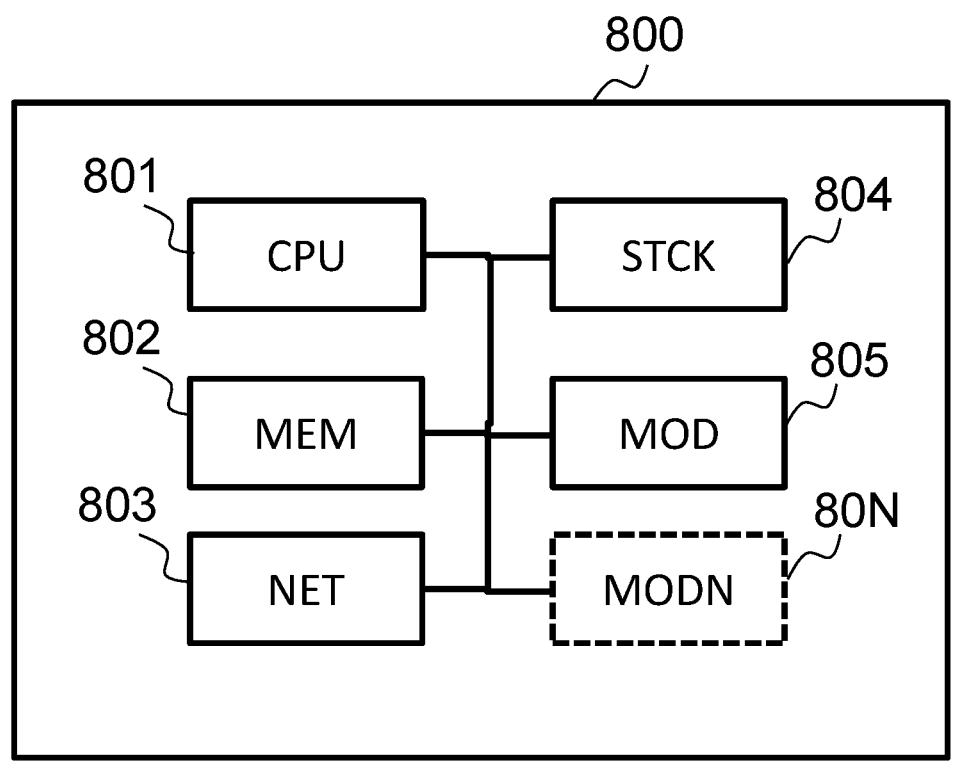
FIG. 8 illustrates schematically the hardware architecture of a server adapted for implementing a method for selecting a gateway among a plurality of gateways for sending a frame to an electronic device of a communication network known as a "long range wide-area network", according to an embodiment of the invention.

FIG. 8 illustrates schematically the hardware architecture of a server 800, for example the central server 110, adapted for implementing the method for selecting a gateway among a plurality of gateways for sending a frame to an electronic device 101 of the communication network 100 known as a long range wide-area network, a method described in FIGS. 2, 3 and 4. The server 800 comprises, connected by a communication bus: a processor or CPU (central processing unit) 801; a memory MEM 802 of the RAM (random access memory) and/or ROM (read only memory) type, a network module NET 803, a storage module STCK 804 of the internal storage type, and possibly other modules 805 to 80N of various natures. The storage module STCK 804 may be of the hard disk HDD (hard disk drive) or SSD (solid-state drive) type, or of the external storage medium reader type, such as an SD (secure digital) card reader. The processor CPU 801 can record data on the storage module STCK 804 or read data recorded on the storage module STCK 804. These data may correspond to configuration parameters of the server 800 or to information received for example in a message received by the network module NET 803, or via another communication module 80N. The network module NET 803 allows connection of the server 800 to one or more communication networks. The network module 803 typically allows connection of the server 800 to the internet. The network module 803 enables the sever 800 to send and respectively to receive data to and respectively from one or more connected objects, for example the connected object 101, the frames passing via one of the gateways 120, 12$p$, . . . , 12N.

The processor CPU 801 is capable of executing instructions loaded in the memory MEM 802, for example from the storage module STCK 804 or from a communication network via the network module NET 803, or from another communication module 80N for example. When the server 800 is powered up, the processor CPU 801 is capable of reading instructions from the memory MEM 802 and executing them. These instructions form a computer program causing the implementation, by the processor CPU 801, of all or some of the methods and steps described above. Thus all or some of the methods and steps described above may be implemented in software form by the execution of a set of instructions by a programmable machine, such as a DSP (Digital Signal Processor) or a microcontroller. All or some of the methods and steps described here may also be implemented in hardware form by a machine or a dedicated component, such as an FPGA (Field-Programmable Gate Array) or an ASIC (Application-Specific Integrated Circuit). The server 800 is typically a so-called LNS server (LoRa Network Server), namely a server used in a communication network in accordance with the LoRa™ standard.

The server 800 is adapted for implementing all or some of the steps of the method 200 described in FIGS. 2, 3 and 4, as well as the methods described in FIGS. 5, 6 and 7, making it possible to select a gateway from a plurality of gateways for sending a frame to an electronic device of a communication network known as a long range wide-area network according to the first embodiment of the invention. The server 800 is also adapted for implementing all or some of the steps of the method for selecting a gateway from a plurality of gateways for sending a frame to an electronic device of a communication network known as a long range wide-area network according to the second embodiment of the invention, a method described below and in FIGS. 9 and 10.

In the second embodiment of the invention, unlike the first embodiment of the invention, each gateway 120, 12p, . . . , 12N is able to send a plurality of frames simultaneously on different frequencies, frequencies possibly lying in different frequency sub-bands. Furthermore, a new frame to be planned for sending must not overlap another frame already planned for sending on the same frequency. Likewise, the duty cycle credit must be sufficient not only at the start of the sending of the frame, as in the first embodiment, but also throughout the time of sending of the frame to be planned for sending, namely during the period "d". It is therefore theoretically necessary to calculate a duty cycle credit at each instant throughout the time "d" of sending of a frame to be planned for sending, which requires a potentially very long processing time for the central server 110. This processing time may be too long to be compatible with a selection of one of the gateways 120, 12p, . . . , 12N within a time compatible with the ultimate compliance with the response time.

In order to preserve a principle of processing operations similar to the first embodiment of the invention, a duty cycle credit is determined for each frequency "f" of a frequency sub-band "j", and this for each sub-band frequency "j". In other words, it is decided to attribute a duty cycle to be complied with for each frequency of a frequency sub-band. This attribution of a duty cycle for each frequency "f" of a frequency sub-band "j" is determined so as to comply with the duty cycle of each frequency sub-band "j". Thus, "C(j, f,t)" corresponding to the duty cycle for the frequency "f" of the frequency sub-band "j" at time "t", we define:

$$C(j,f,0)=C0(j,f)=p(j,f)\cdot 3600000\cdot DC(j);$$

"DC(j)" is the duty cycle to be complied with, namely the ratio between the sum of the frame-sending times and the non-sending time of the gateway for the carrier frequencies lying in the sub-band "j"; DC(j) is expressed as a percentage.

"C0(j,f)" is a maximum duty cycle credit, expressed for an arbitrary reference period of one hour (3600 seconds) for the frequency "f" of the frequency sub-band "j". The parameters "p(j,f)" define a weighting, such that:

$$\sum_{f\in subband(j)} p(j,f) = 1$$

with the value of p(j,f) lying between "0" and "1".
Thus we have:

$$\sum_{f\in subband(j)} C0(j,f) = C0(j)$$

For example "p(j,f)=1/NbFreq" with "NbFreq" equal to the number of frequencies "f" lying in the frequency sub-band "j".

Each time one of the gateways 120, 12p, . . . , 12N sends a frame on a frequency "f" of a frequency sub-band "j", its duty cycle credit is equal to:

$$C(j,f,Tend)=C(j,f,Tstart)-(1-DC(j))\cdot d; with:$$

"Tstart" the frame-sending start time,
"Tend" the frame-sending end time,
"d" the duration of sending of the frame,
"DC(j)" is the duty cycle to be complied with for the frequency sub-band "j".

The method for the selection, by a central server 110 of a communication network 100 known as a long range wide-area network, of a gateway from a plurality of gateways 120, 12p, . . . , 12N for sending a frame to an electronic device 101 in response to a frame sent by this electronic device 101, according to the second embodiment of the invention, is similar to the selection method described in FIGS. 2, 3 and 4 and corresponding to the first embodiment, except that the steps 304, 305 and 310 and respectively 404, 405 and 406 are different:

for steps 304 and 404, a check on any frame overlap is simpler since it is limited to an overlap with a frame already planned on the single sending frequency, for steps 305, 310, 405 and 406, the use of one duty cycle credit per frequency "f" in addition to the duty cycle credit for a frequency sub-band "j".

The duty cycle (or credit) on the frequency "f" of the frequency sub-band "j" of one of the gateways 120, 12p, . . . , 12N at a time "T+t" with respect to the duty cycle at time "T" is expressed by:

$$C(j,f,T+t)=\min(C0(j,f);C(j,f,T)+t-(2-DC(j))\cdot \Sigma_{k=1}^{N} Listd(j,f,k)),$$

with:
"C(j,f,t)" the duty cycle for the frequency "f" of the sub-band "j" at time "t", "min (a,b)" a function selecting the minimum value between the arguments "a" and "b", "C0(j,f)" a maximum value of the duty cycle for the frequency "f" of the sub-band "j", expressed for an arbitrary reference period of one hour (3600 seconds), as described previously, "DC(j)" is the duty cycle to be complied with for the frequency sub-band "j", namely the ratio between the sum of the frame-sending times and the non-sending time of the gateway for the carrier frequencies included in the sub-band "j"; DC(j) is expressed as a percentage, "Listd(j,f,k)", in a similar fashion to "Listd(j,k)" previously described, corresponds to the duration of sending, by the gateway in question, of a planned frame "k" on the frequency "f" of the sub-band "j", "N" corresponds to the total number of planned frames for sending by the gateway in question on the sub-band "j" up to time "T+t".

Figure 9:
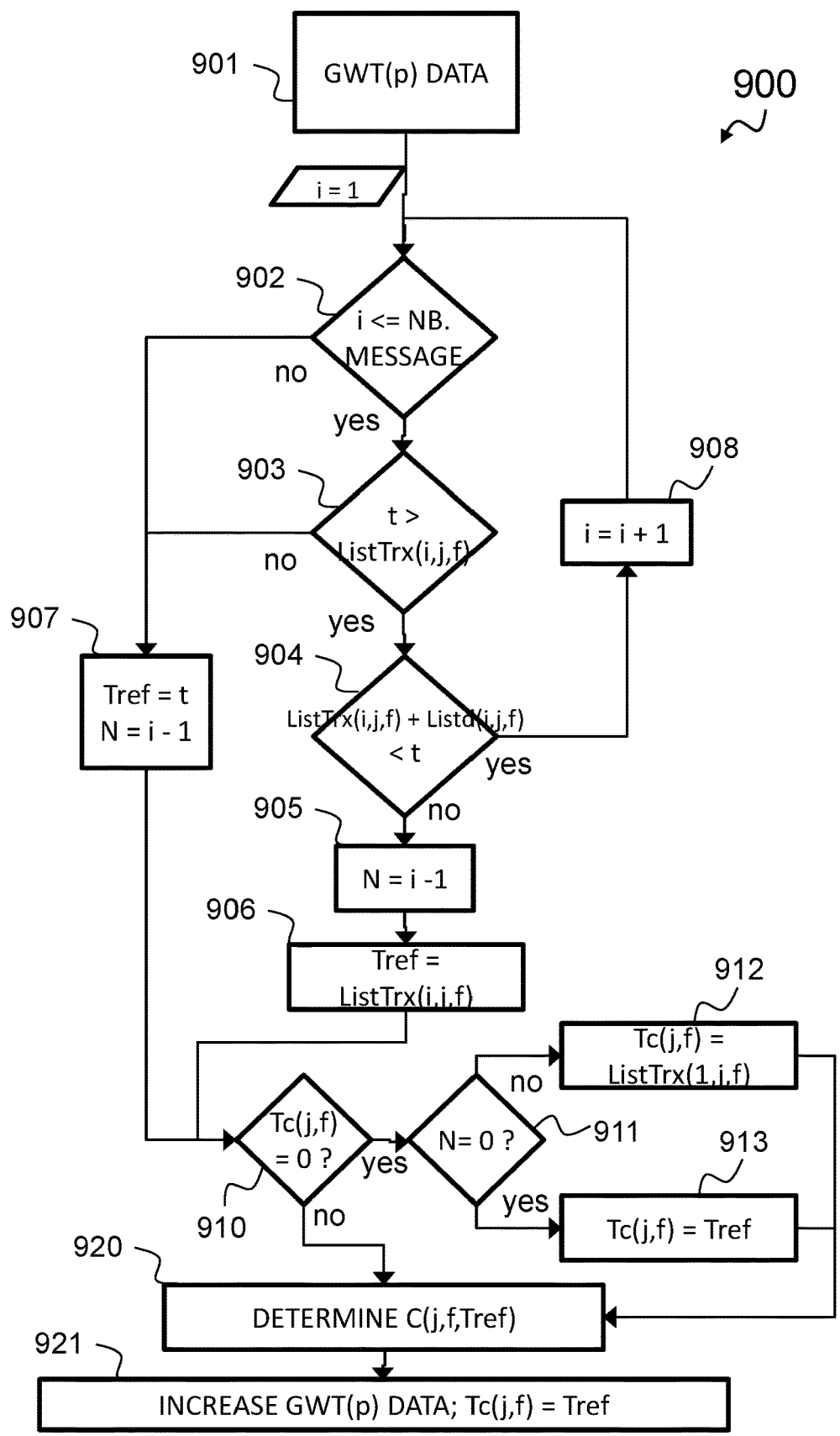
FIG. 9 illustrates schematically a method for updating planning data for the sending of frames for a gateway included in a communication network known as a "long range wide-area network", according to a second embodiment of the invention.

FIG. 9 illustrates schematically a method 900 for updating frame-sending planning data for a gateway 120, 12p, ..., 12N included in a communication network known as a long range wide-area network, according to a second embodiment of the invention.

The method 900 is similar overall to the method 500 described in FIG. 9, with the notable exception that:
- "ListTrx(i,j,f)" replaces the variable "ListTrx(i,j)" used in FIG. 5,
- "Listd(j,f,k)" replaces the variable "Listd(i,j)" used in FIG. 5,
- the calculation of C(j, f, Tref) replaces the calculation of C(j, Tref) used in FIG. 5,
- "Tc(j,f)" replaces "Tc(j)" used in FIG. 5.

Thus "ListTrx(i,j,f)" corresponds to the time of sending of the "$i^{th}$" frame to be sent on the frequency "f" of the frequency sub-band "j" by said gateway and "Listd(i,j,f)" to the duration of said "$i^{th}$" frame for the frequency "f" of the frequency sub-band "j".

Step 901 corresponds to the loading of the data corresponding to the gateway where it is wished to update the duty cycle for the frequency "f" of the sub-band "j" in the memory of the central server 110. These data may be recorded on the central server 110 itself. The value of a variable "i" is initialised to "1" before passing to step 902.

In step 902, the central server 110 determines whether "i" has exceeded the number of elements included in the list "ListTrx(j,f)" comprising all the frames planned for the gateway in question on the frequency "f" of the sub-band "j". If "i" is less than the number of frames planned for sending on the frequency "f" of the frequency sub-band "j", then the central server 110 passes to step 903. Otherwise it passes to step 907.

In step 903, the central server 110 determines whether the current time "t" corresponding to the local time of the central server 110, possibly synchronised via NTP, is less than the planning time for sending of the frame "i" on the frequency "f" of the frequency sub-band "j". If the frame is planned for subsequent sending or sending simultaneous with the current time "t", namely if "t<=ListTrx(i,j,f)" then the central server 110 passes to step 907. If on the other hand "t>ListTrx(i,j,f)", then the central server 110 passes to step 904.

Step 903 makes it possible to determine whether the current time "t" may correspond to a moment of sending of a frame "i". Step 904 makes it possible to ensure that the current time is subsequent to the time of sending the frame "i". In other words, if "ListTrx(i,j,f)+Listd(i,j,f)<t", then the current time "t" is subsequent to the end of sending of the frame "i", sent at time "ListTrx(i,j,f)" and having a duration of sending "Listd(i,j,f)". The central server 110 then passes to step 908 in order to increment "i" by "1". Then, following step 908, the central server 110, after having checked in a new step 902 that the number of frames has not been exceeded, recommences step 903 with the following frame. If on the other hand "ListTrx(i,j,f)+Listd(i,j,f)>=t", knowing that the central server 110 determined during step 903 that "t>ListTrx(i,j,f)", this means that the current time "t" corresponds to a moment of sending of the frame "i". In this case, in a following step 905, the central server 110 stores "N=i−1". Then, in a step 906, the central server 110 defines a variable "Tref" corresponding to a reference time for calculating the duty cycle, with "Tref=t". In other words, in step 906, the central server 110 defines the reference time "Tref" as being equal to the time "ListTrx(i,j,f)" corresponding to the sending of the frame "i" on the frequency "f" of the frequency sub-band "j". The "$N^{th}$" frame in the "ListTrx (j,f)" corresponds to the last frame planned for sending by the gateway in question before the reference time "Tref". Thus it will be necessary to consider these "N" frames for calculation of the duty cycle on the frequency "f" of the frequency sub-band "j".

During step 907, the reference time "Tref" is defined equal to the current time "t". This corresponds to a situation where the current time does not correspond to a moment of sending of a frame "i".

Following steps 906 and 907, the central server 110 passes to step 910. During step 910, the central server 110 determines the value of the variable "Tc(j,f)". "Tc(j,f)" corresponds to the last reference time used during the previous iteration of the updating method 900 for the gateway in question for the frequency "f" of the frequency sub-band "j". During the first iteration of the method 900, the value of "Tc(j,f)" is defined equal to "zero", the default value. If "Tc(j,f)=0", then the central server 110 passes to step 911 in order to determine whether frames are planned for sending before the reference time "Tref". In other words, if "N=0", then, in a step 913, the central server 110 defines "Tc(j,f)=Tref". In other words, no frame being planned for sending before the reference time "Tref", the value of "Tc(j,f)" can be fixed at "Tref" without modifying the duty cycle, since the latter is already at its maximum value. If on the other hand "N" is different from "zero", this means that it is necessary to take account of the frames to be sent for calculating the duty cycle and, in a step 912, the central server 110 defines "Tc(j,f)=ListTrx(1, j, f)" in order to start the calculation of the duty cycle at the sending of the first frame.

Following step 912 or 913, or if in step 910 "Tc(j,f)" is different from "zero", the central server 110 passes to step 920. Step 920 corresponds to the step of calculating the duty cycle "C(j, f,Tref)":

$$C(j, f, Tref) = \min(C0(j, f); C(j, f, Tc(j, f) + Tref - Tc(j, f) - (2 - DC(j)) \cdot \sum_{k=1}^{N} Listd(j, k, f)$$

In a following step 912, the central server 110 updates the frame-sending planning data for the gateway in question for the frequency "f" of the frequency sub-band "j". This updating comprises the deletion of the first "N" elements in the lists "ListTrx(j,f)" and "Listd(j,f)" for the frequency "f" of the frequency sub-band "j". The central server 110 stores the reference time "Tref" and the duty cycle for this reference time for a future iteration, namely:
- "Tc(j,f)" takes the value "Tref", and
- "C(j, f,Tc(j))" takes the value C(j, f,Tref)", for subsequent use of these two updated values of "Tc(j,f)" and of "C(j, f,Tc(j))" in a new iteration of the method 900 for the gateway in question for the frequency "f" of the frequency sub-band "j".

Figure 10:
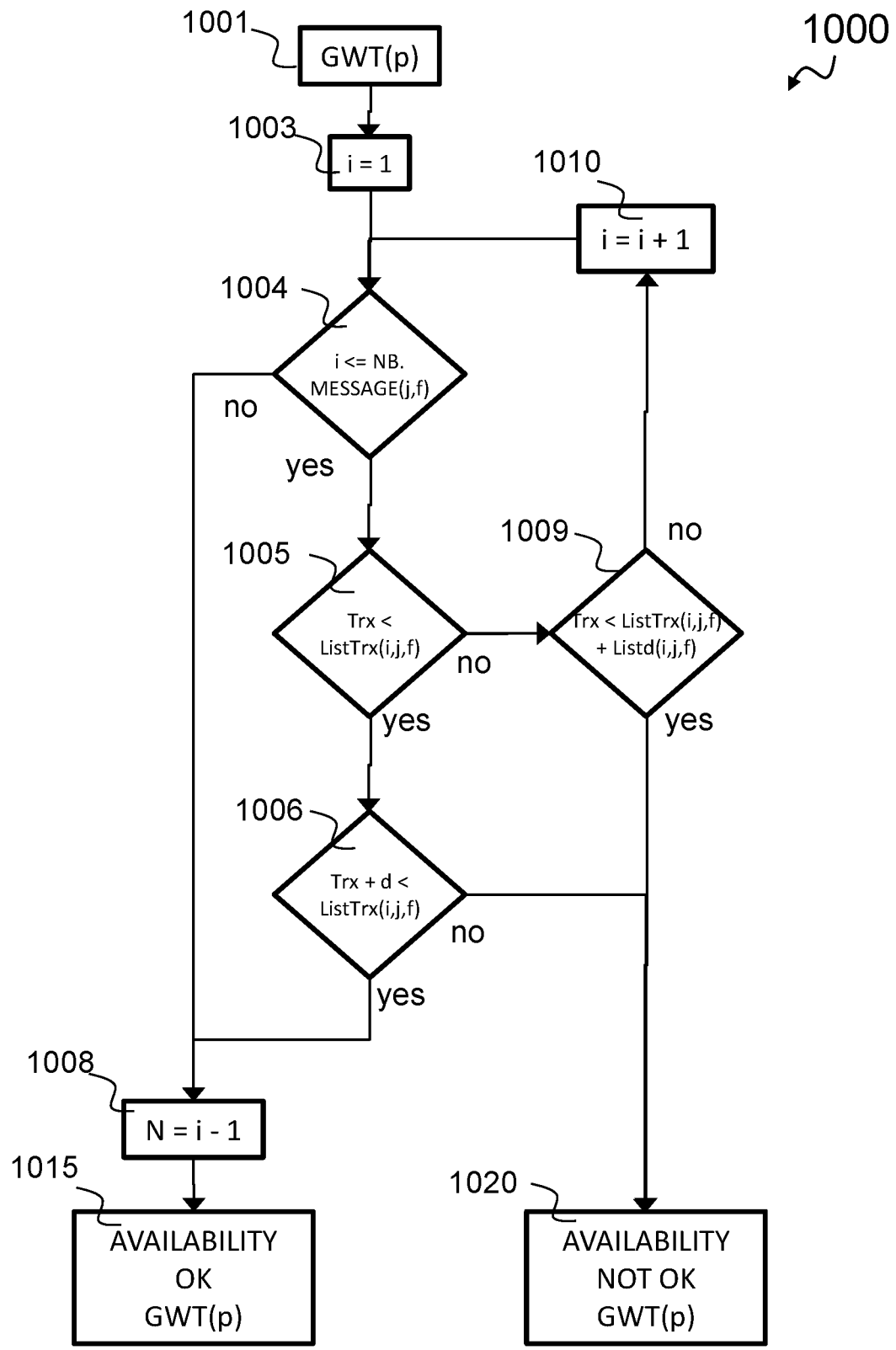
FIG. 10 illustrates schematically a method for checking that a frame to be sent can be inserted in the planning frames to be sent from a gateway, according to the second embodiment of the invention.

FIG. 10 illustrates schematically a method 1000 for checking that a frame to be sent can be inserted in the planning for frames to be sent from a gateway 120, 12p, ..., 12N, according to the second embodiment of the invention.

The method 1000 is similar overall to the method 600 described in FIG. 6, with the notable exception that:
"ListTrx(i,j,f)" replaces the variable "ListTrx(i,j)" used in FIG. 6,
"Listd(j,f,k)" replaces the variable "Listd(i,j)" used in FIG. 6,
the calculation of C(j, f, Tref) replaces the calculation of C(j, Tref) used in FIG. 6,
"Tc(j,f)" replaces "Tc(j)" used in FIG. 6.

Another notable difference from the method 600 is that it is not necessary in the case of the method 1000 to check any overlap of a frame to be planned for sending on a frequency with another frame already planned for sending on another different frequency. Only the frames planned for sending on the sending frequency must be considered. Indeed, according to this second embodiment, a gateway 120, 12p, . . . , 12N can send possibly a plurality of frames simultaneously on different frequencies.

Thus the variable "k" used in the method 600 described in FIG. 6 is not used in the method 1000 previously described. Steps 602 and 607 of the method 600 do not have an equivalent in the method 1000.

The method 1000 illustrated in FIG. 10 corresponds to the equivalents of steps 304 or 404 of the method for a gateway "p" having to plan the sending of a frame on a frequency "f" included in a frequency sub-band "j" according to the second embodiment of the invention.

In a step 1001, the central server 110 finds the frame-sending planning data for the gateway in question for the frequency "f" of the frequency sub-band "j". These data have possibly previously been found by the central server 110.

In a step 1003, the central server 110 initialises or reinitialises the value of a variable "i" to "1". The central server 110 passes to a test 1004.

During step 1004, the central server 110 checks that "i" is less than the number of frames planned for sending on the frequency "f" of the frequency sub-band "j", namely less than the number of elements in the list "ListTrx(j,f) for the gateway "p". If so, the central server 110 passes to step 1005, otherwise to step 1008.

In step 1005, the central server 110 determines whether the time of sending of the second frame "Trx" is less than the time "ListTrx(i,j,f)" of sending the planned frame "i" for the frequency "f" of the frequency sub-band "j". If so, the central server 110 passes to step 1006, otherwise it passes to step 1009. If "Trx" is less than the time for sending the planned frame "i" for the frequency "f" of the frequency sub-band "j", this means that the second frame must be sent before the frame "i". It is then necessary next to check whether the delay between the time "Trx" and the start of the sending of the frame "i" for the frequency "f" of the frequency sub-band "j" is sufficient for sending the second frame, knowing that the duration of sending of the second frame is "d".

This check is carried out during step 1006. Thus, if "Trx+d" is greater than "ListTrx(i,j,f)", then there is not a sufficient delay for sending the second frame before the planned sending of the frame "i" for the frequency "f" of the frequency sub-band "j", and the central server 110 passes to step 1020. Step 1020 corresponds to the fact that the gateway in question "p" is not available for sending the second frame. The method for selecting a gateway according to the second embodiment then continues with the equivalent of a step 306 in the case of a priority second frame and with the equivalent of a step 407 in the case of a non-priority second frame.

Following step 1006, if "Trx+d" is less than "ListTrx(i,j,f)", this means that the delay between "Trx" and the start of the sending of the frame "i" for the frequency "f" of the frequency sub-band "j" is sufficient for sending the second frame of duration "d". The central server 110 then passes to step 1008.

During step 1008, the central server 110 stores, for a variable "N", the value "i−1", "N" corresponding to the last frame planned for sending on the frequency "f" of the frequency sub-band "j" before the second frame, or, in other words, to the planned frame, on the frequency "f" of the frequency sub-band "j", that has to be sent just before the second frame. The central server 110 next passes to step 1015.

During step 1009, the central server 110 determines whether the time for sending the second frame "Trx" corresponds to a moment during which the gateway is planned for sending the frame "i" for the frequency "f" of the frequency sub-band "jj" of duration "Listd(i,j,f)". If "Trx" is less than "ListTrx(i,j,f)+Listd(i,j,f)", knowing from step 1005 that "Trx" is greater than "ListTrx(i,j,f)", then "Trx" corresponds to a moment of sending the frame "i" for the frequency "f" of the frequency sub-band "j" and the central server 110 passes to step 1020. Otherwise the central server 110 passes to step 1010, corresponding to the incrementation of the variable "i", with "i=i+1", and then goes to step 1004 again.

The invention claimed is:

1. A method for a communication system comprising an electronic device and a plurality of gateways, the electronic device and each gateway being adapted for transmitting and receiving frames on a radio frequency band, each gateway being connected to a central server, a first frame being sent by the electronic device to the central server, the frame comprising an identifier of the electronic device, each gateway receiving said frame and transmitting the received frame, in association with an identifier of the gateway, to the central server, a response delay being predefined for responding to the first frame, the method enabling selection by the central server of a gateway among the plurality of gateways for sending a second frame to the electronic device in response to the first frame, the method being executed by the central server and comprising:
receiving the first frame from a first gateway,
determining a moment of sending and a duration of the second frame that is to be sent in response,
creating a list in association with the identifier of the electronic device, the list comprising the identifier of the first gateway,
triggering a waiting delay during which, if the central server receives from an other gateway another frame sent by the electronic device, then:
adding to the list the identifier of the other gateway that transmitted the frame,
at the expiry of the waiting delay, choosing at least one gateway the identifier of which is included in the list and, for this gateway:
finding planning data for frame sending by said gateway, and
checking whether selection criteria, dependent on the moment of sending and on the duration of the second frame, as well as on the planning data for frames sending of the gateway, are met,
if the selection criteria are met, then selecting said gateway for sending the second frame in response to the first frame to the electronic device.

2. The method according to claim 1, wherein, each gateway transmitting a received frame in association with an identifier of the gateway and an indication about reception power of the frame, the method further comprises:

during the step of adding an identifier of a gateway to the list, adding the indication about the reception power in association with the identifier of the gateway and, during the step of choosing a gateway in the list, choosing the gateway dependently on the reception power associated with each identifier.

3. The method according to claim 2, the wherein, if, during the waiting delay, the central server receives a frame the reception power of which is lower than a predetermined value, then said frame is ignored for the remainder of the method.

4. The method according to claim 2, the planning data on the sending of a frame for each gateway comprising a parameter referred to as duty cycle, said parameter being a maximum ratio of the time spent by the said gateway in sending frames over a given period, each gateway in the list being successively chosen in order to check the selection criteria, wherein selecting the gateway comprises determining the value of the duty cycle at the moment of sending of the second frame for a gateway, and selecting the gateway dependently on the determined value of the duty cycle.

5. A non-transitory storage medium storing a computer program comprising instructions for implementing, by a processor, the method for selecting a gateway among a plurality of gateways for sending a frame according to claim 1, when the computer program is executed by the processor.

6. A central server for a communication system comprising an electronic device and a plurality of gateways, the electronic device and each gateway being adapted for sending and receiving frames on a radio frequency band, each gateway being connected to the central server, a first frame being sent by the electronic device to the central server, the frame comprising an identifier of the electronic device, each gateway receiving said frame and transmitting the received frame, in association with an identifier of the gateway, to the central server, a response delay being predefined for responding to the first frame, wherein the central server is adapted, in order to select a gateway among the plurality of gateways for sending a second frame to the electronic device in response to the first frame, for:

receiving the first frame from a first gateway, determining a moment of sending and a duration of the second frame that is to be sent in response, creating a list in association with the identifier of the electronic device, the list comprising the identifier of the first gateway, triggering a waiting delay during which, if the central server receives from an other gateway another frame sent by the electronic device, then:

adding to the list the identifier of the other gateway that transmitted the frame, at the expiry of the waiting delay, choosing at least one gateway the identifier of which is included in the list and, for this gateway:

finding planning data for frame sending by said gateway, and checking whether selection criteria dependent on the moment of sending and on the duration of the second frame as well as on the planning data for frames sending of the gateway, are met, if the selection criteria are met, then selecting said gateway for sending the second frame in response to the first frame to the electronic device.

7. A communication system comprising an electronic device and a plurality of gateways, the electronic device and each gateway being adapted for sending and receiving frames on a radio-frequency band, each gateway being connected to a central server, a first frame being sent by the electronic device to the central server, the frame comprising an identifier of the electronic device, each gateway receiving said frame and transmitting the frame received, in association with an identifier of the gateway, to the central server, a response delay being predefined in order to respond to the first frame, wherein the central server is adapted, in order to select a gateway among the plurality of gateways for sending a second frame to the electronic device in response to the first frame, for:

receiving the first frame from a first gateway, determining a moment of sending and a duration of the second frame that is to be sent in response, creating a list in association with the identifier of the electronic device, the list comprising the identifier of the first gateway, triggering a waiting delay during which, if the central server receives from an other gateway another frame sent by the electronic device, then:

adding the identifier of the other gateway that transmitted the frame to the list, at the expiry of the waiting delay, choosing at least one gateway the identifier of which is included in the list and, for this gateway:

finding planning data for frame sending by said gateway, and checking whether selection criteria dependent on the moment of sending and on the duration of the second frame as well as on the planning data for frames sending of the gateway, are met, if the selection criteria are met, then selecting said gateway for sending the second frame in response to the first frame to the electronic device.

* * * * *